(12) United States Patent
Sawada

(10) Patent No.: US 7,784,512 B2
(45) Date of Patent: Aug. 31, 2010

(54) PNEUMATIC TIRE AND TIRE/RIM ASSEMBLY

(75) Inventor: Hiroki Sawada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 456 days.

(21) Appl. No.: 11/793,214

(22) PCT Filed: Dec. 19, 2005

(86) PCT No.: PCT/JP2005/023259

§ 371 (c)(1),
(2), (4) Date: Jun. 18, 2007

(87) PCT Pub. No.: WO2006/068085

PCT Pub. Date: Jun. 29, 2006

(65) Prior Publication Data

US 2008/0135153 A1    Jun. 12, 2008

(30) Foreign Application Priority Data

Dec. 20, 2004    (JP) .............................. 2004-368143
Dec. 22, 2004    (JP) .............................. 2004-371612

(51) Int. Cl.
*B60C 5/20*    (2006.01)
*B60C 5/22*    (2006.01)

(52) U.S. Cl. .................. 152/331.1; 152/339.1; 152/450; 152/539; 152/555

(58) Field of Classification Search .............. 152/331.1, 152/333.1, 334.1, 339.1, 340.1, 450, 539, 152/555

See application file for complete search history.

(56) References Cited

U.S. PATENT DOCUMENTS 6,615,888 B2 *    9/2003    Elkow ...................... 152/342.1

FOREIGN PATENT DOCUMENTS

DE        4200735        *    7/1993
JP        2003-39914 A        2/2003

OTHER PUBLICATIONS

Machine translation of JP 2003-39914, 2003.*

* cited by examiner

*Primary Examiner*—Justin Fischer
(74) *Attorney, Agent, or Firm*—Sughrue Mion, PLLC

(57) ABSTRACT

To provide a pneumatic tire capable of improving the durability of connection points between partition wall parts and a tire inside surface.

In a pneumatic tire 10, partition wall parts 24 that extend inward in a tire radial direction from a tire inside surface 17 of tire shoulder parts 21 and whose tire radial direction inside ends contact a rim 12 are disposed. A pair of right and left reinforcement layers 38 are disposed in regions ranging from the partition wall parts 24 to tire side parts 20 via connection parts 29 between the partition wall parts 24 and the tire inside surface 17 such that the reinforcement layers 38 continue from the partition wall parts 24 to the tire side parts 20 via the connection parts 29 between the partition wall parts 24 and the tire inside surface 17. Because of the reinforcement layers 38, the portion of each of the connection parts 29 between the partition wall parts 24 and the tire inside surface 17 where a first carcass ply 32 is disposed and the portion thereof where a second carcass ply 37 is disposed can be prevented from separating, whereby the durability of the connection parts 29 of the partition wall parts 24 can be improved in comparison to what has conventionally been the case.

10 Claims, 11 Drawing Sheets

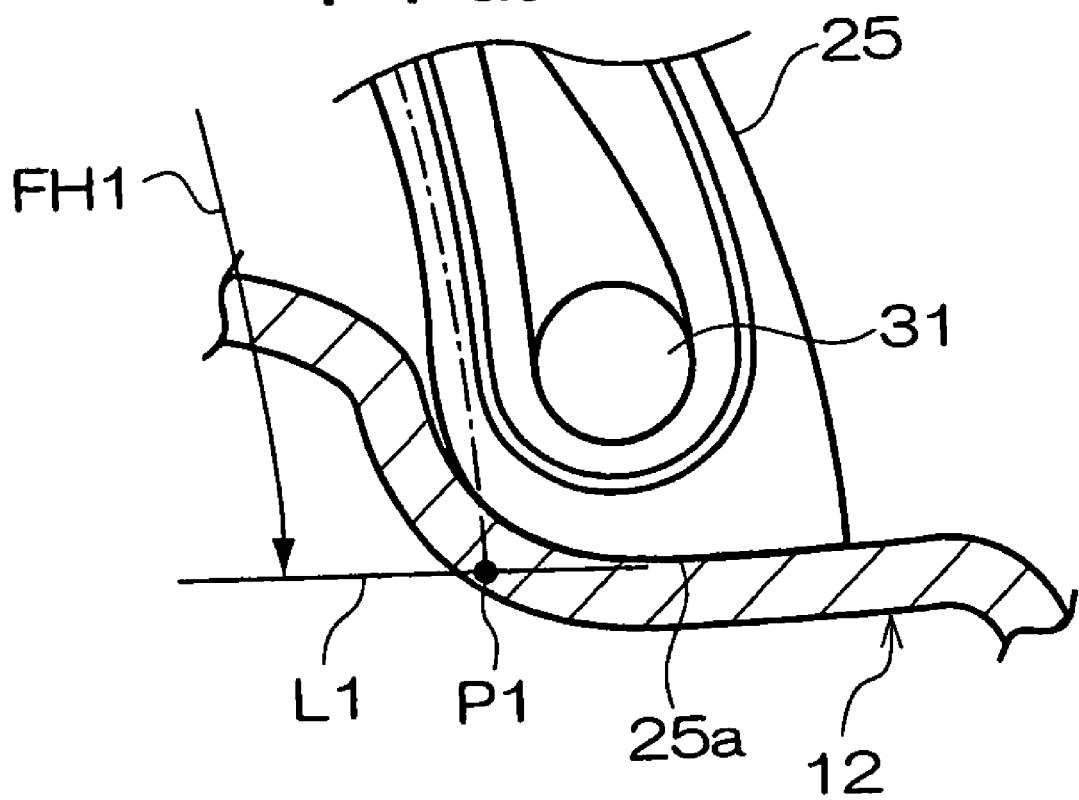

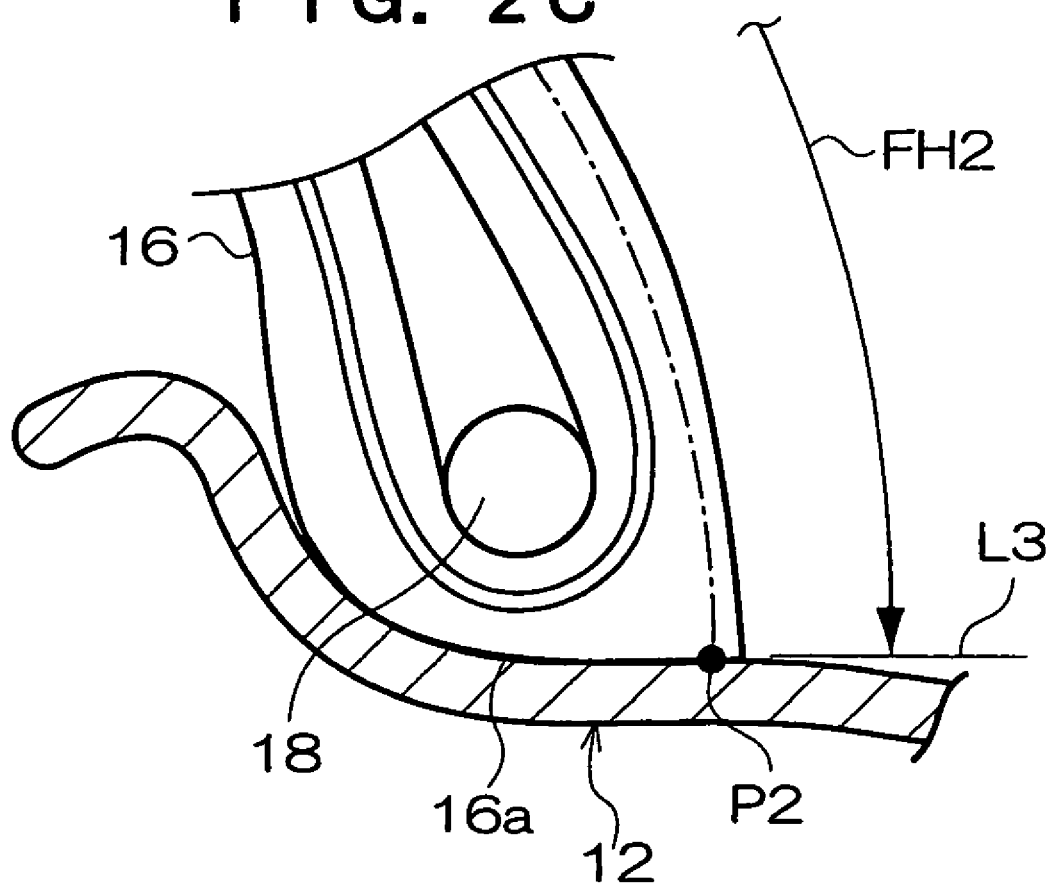

PNEUMATIC TIRE AND TIRE/RIM ASSEMBLY

TECHNICAL FIELD

The present invention relates to a pneumatic tire and to a tire/rim assembly, and in particular to a pneumatic tire where a tire air chamber is divided plurally in a tire width direction by partition wall parts formed on a tire inner side and to a tire/rim assembly.

BACKGROUND ART

Conventionally, a pneumatic tire has been known where a tire air chamber is divided plurally in a tire width direction by partition wall parts formed on a tire inner side (e.g., see Patent Document 1).

For example, in the pneumatic tire described in Patent Document 1, a pair of partition wall parts that tripartition in the tire width direction a tire air chamber formed between the pneumatic tire and a rim when the pneumatic tire is attached to the rim is disposed.

To briefly describe the configuration of the pneumatic tire described in Patent Document 1, in this pneumatic tire, a first carcass ply that toroidally bridges outside bead cores is disposed, and a second carcass ply that toroidally bridges inside bead cores is disposed on the inside of the first carcass ply.

Additionally, the partition wall parts extend inward in the tire radial direction along the second carcass ply from a tire inside surface in the vicinity of tire shoulder parts and are configured such that their tire radial direction inside ends contact the rim. Further, the inner diameter of outside bead parts and the inner diameter of inside bead parts are configured to be the same.

Further, according to the pneumatic tire described in Patent Document 1, it becomes possible to set the air pressures of each of the tripartitioned tire air chambers to all different arbitrary pressures because the tire air chamber can be tripartitioned in the tire width direction by the partition wall parts into mutually independent tire air chambers.

Patent Document 1: JP-A No. 2003-39914 (FIG. 3)

DISCLOSURE OF THE INVENTION

Problem that the Invention is to Solve

However, in the pneumatic tire described in Patent Document 1, there have been the following problems because the inner diameter of the outside bead parts and the inner diameter of the inside bead parts have been set to be the same. That is, in the rim described in Patent Document 1, because a bead sheet has a constant diameter in the width direction, sometimes the internal pressures of air chambers that are adjacent differ and the partition wall parts end up moving and causing air leakage.

Thus, in actuality, the inside bead parts formed in the partition wall parts are to be fixed, so in a rim with a constant diameter, they must be fixed using an adhesive, and when an adhesive is not used, a specially shaped rim where tall hump parts for deterring movement of the inside bead parts are disposed on the sides of the inside bead parts must be used, and because the inside bead parts of the partition wall parts catch on the hump parts during rim assembly and the tire inner side also cannot be seen, disposing the inside bead parts of the partition wall parts in predetermined positions has been difficult, and rim attachment work has been extremely difficult.

Further, in the pneumatic tire described in Patent Document 1, sometimes the portion of each of the connection parts between the partition wall parts and the tire inside surface where the first carcass ply is disposed and the portion thereof where the second carcass ply is disposed end up separating as a result of the tire repeatedly bending in accompaniment with tire rotation.

Particularly when traveling on an expressway, for example, in a state in which, of the tire air chambers, the internal pressures of the auxiliary air chambers on both tire width direction sides have been made higher than the internal pressure of the main chamber in the tire width direction center, the force that separates the portion of each of the connection parts between the partition wall parts and the tire inside surface where the first carcass ply is disposed and the portion thereof where the second carcass ply is disposed becomes stronger, so there has been the problem that it becomes easier for separation of the portion where the first carcass ply is disposed and the portion where the second carcass ply is disposed to occur.

Further, in a pneumatic tire disposed with partition wall parts inside the tire such as described in Patent Document 1, when the tire side parts and the connection parts between the tread part and the partition wall parts are positioned inside the tread of the tread part, there is the potential for the partition wall parts to sustain damage because the force applied to the partition wall parts from the road surface increases as a result of the normals of the tread part becoming closer to the formation direction of the partition wall parts.

The present invention has been made in view of the above circumstances, and it is an object thereof to ameliorate, in a pneumatic tire where a tire air chamber is divided plurally in a tire width direction by partition wall parts formed on a tire inner side and in a tire/rim assembly, the work of attaching the pneumatic tire to the rim and improve the durability of the pneumatic tire.

Means for Solving the Problem

A pneumatic tire recited in claim 1 comprises: a pair of right and left tire side parts formed on both tire width direction sides; a tread part that interconnects a tire radial direction outside end of one of the tire side parts and a tire radial direction outside end of the other of the tire side parts of the pair of right and left tire side parts; and a pair of right and left partition wall parts that are disposed between outside bead parts formed in the pair of right and left tire side parts and apart from the outside bead parts in the tire width direction, extend inward in the tire radial direction from a tire inside surface of at least one of the tire side parts and the tread part, are configured to include inside bead parts that contact a rim at their tire radial direction inside ends, and tripartition in the tire width direction a tire air chamber formed by the tire side parts, the tread part and the rim, wherein the inner diameter of the outside bead parts is formed to be larger than the inner diameter of the inside bead parts, and a pair of right and left reinforcement layers are disposed in regions ranging from the partition wall parts to the tire side parts via connection parts between the partition wall parts and the tire inside surface such that the reinforcement layers continue from the partition wall parts to the tire side parts via the connection parts between the partition wall parts and the tire inside surface.

Next, the action of the pneumatic tire recited in claim 1 will be described.

The pneumatic tire recited in claim 1, in which the inner diameter of the outside bead parts is formed to be larger than the inner diameter of the inside bead parts, is attached to a rim provided with outside bead sheets set to be the same in diameter as the inner diameter of the outside bead parts and inside bead sheets that are disposed via step parts at the tire axial direction inner sides of the outside bead sheets and set to be the same in diameter as the inner diameter of the inside bead parts; thus, a tire/rim assembly disposed with three tire air chambers that are independent in the tire axial direction is obtained.

In this tire/rim assembly, even with respect to either a puncture in the tread resulting from rolling over a nail or the like or a puncture in the side parts resulting from curb scraping or the like, the tire air chambers that have not been punctured support the load, so although a slight deterioration of steering stability and increase in vibration harshness accompanies this, travel can be safely continued without problem.

Step parts that deter movement of the inside bead parts outward in the tire width direction are formed, by the difference in the diameters of the outside bead sheets and the inside bead sheets, between the outside bead sheets to which the outside bead parts attach and the inside bead sheets to which the inside bead parts attach, so it is not necessary to form, on the tire width direction outer sides of the inside bead parts, tall hump parts onto which the inside bead parts catch during rim attachment and which worsen workability, and rim attachment becomes easy.

It will be noted that hump parts on the tire width direction inner sides of the inside bead parts are not required.

Further, because the pair of right and left reinforcement layers ranging from the partition wall parts to the tire side parts via the connection parts between the partition wall parts and the tire inside surface are provided at the pneumatic tire recited in claim 1, the strength of the connection parts between the partition wall parts and the tire inside surface can be improved by the reinforcement layers. For this reason, even when the tire repeatedly bends in accompaniment with tire rotation, separation can be prevented from occurring at the connection parts between the partition wall parts and the tire inside surface. In this manner, according to the pneumatic tire of the present invention, the durability of the connection parts between the partition wall parts and the tire inside surface can be improved by providing the reinforcement layers.

Particularly when traveling on an expressway, for example, in a state in which, of the tire air chambers, the internal pressures of the auxiliary air chambers on both tire width direction sides have been made higher than the internal pressure of the main air chamber in the tire width direction center, the strength of the connection parts between the partition wall parts and the tire inside surface is improved by the reinforcement layers, whereby separation can be prevented from occurring at the connection parts between the partition wall parts and the tire inside surface. In this manner, according to the pneumatic tire of the present invention, durability during high-speed travel can also be improved at each stage in comparison to what has conventionally been the case.

An invention recited in claim 2 comprises the pneumatic tire of claim 1, wherein the reinforcement layers are configured by any of slanting cord layers, triaxial fabric, or non-woven fabric, or by a combination of these.

Next, the action of the pneumatic tire recited in claim 2 will be described.

In this manner, when the reinforcement layers are configured by any of slanting cord layers, triaxial fabric, or non-woven fabric, or by a combination of these, then the strength of the connection parts between the partition wall parts and the tire inside surface can be raised even more, which is preferable.

An invention recited in claim 3 comprises the pneumatic tire of claim 1 or claim 2, wherein when RO represents the inner diameter of the outside bead parts and RI represents the inner diameter of the inside bead parts, then $0 < RO-RI < 50$ mm is satisfied.

Next, the action of the pneumatic tire recited in claim 3 will be described.

When the relationship between the inner diameter RO of the outside bead parts and the inner diameter RI of the inside bead parts is such that $RO=RI$, then a rim disposed with tall hump parts for deterring movement of the inside bead parts formed in the partition wall parts outward in the tire axial direction must be used and the attachment work inevitably becomes extremely difficult. Further, when $RO-RI \geqq 50$ mm, tire manufacture by current tire manufacturing methods becomes difficult and unrealistic.

Moreover, when the relationship between the inner diameter RO of the outside bead parts and the inner diameter RI of the inside bead parts is such that $RO-RI \geqq 50$ mm, then the inner diameter of the inside bead parts becomes too small with respect to the inner diameter of the outside bead parts, and the inner diameter of the rim becomes smaller in accompaniment therewith, which results in the diameter of a brake capable of being attached to the rim inner side becoming smaller. This is not preferable as there is the potential for this to lower vehicle dynamics.

Consequently, when $0 < RO-RI < 50$ mm, drawbacks can be prevented from occurring as described above, which is preferable.

An invention recited in claim 4 comprises the pneumatic tire of any one of claim 1 to claim 3, wherein when return folding points of the reinforcement layers are located in tire radial direction outermost portions of the reinforcement layers positioned on the connection parts between the partition wall parts and the tire inside surface, W1 represents the length of a portion of each of the reinforcement layers extending toward the inside bead parts along the reinforcement layers from the return folding points of the reinforcement layers, W2 represents the length of a portion of each of the reinforcement layers extending toward the outside bead parts along the reinforcement layers from the return folding points of the reinforcement layers, FH1 represents, when the reinforcement layers are hypothetically allowed to extend as far as inside bead part projecting end reference lines that are parallel to a tire rotational axis direction and pass through bead base projecting ends of the inside bead parts along the partition wall parts, the length of a portion of each of the partition wall parts ranging from the return folding points of the reinforcement layers to intersection points between hypothetical extension lines of the reinforcement layers and the inside bead part projecting end reference lines, and FH2 represents, when the reinforcement layers are hypothetically allowed to extend as far as outside bead part projecting end reference lines that are parallel to the tire rotational axis direction and pass through bead base projecting ends of the outside bead parts along the tire side parts, the length of a portion of each of the tire side parts ranging from the return folding points of the reinforcement layers to intersection points between hypothetical extension lines of the reinforcement layers and the outside bead part projecting end reference lines, then $10 \text{ mm} \leqq W1 \leqq FH1$ and $10 \text{ mm} \leqq W2 \leqq FH2$ are satisfied.

The bead base projecting ends of the inside bead parts in this case are portions (e.g., bead toes of the inside bead parts) of bead bases formed on the inside bead parts that project the most inward in the tire radial direction, and the bead base projecting ends of the outside bead parts are portions (e.g., bead toes of the outside bead parts) of bead bases formed on the outside bead parts that project the most inward in the tire radial direction.

Next, the action of the pneumatic tire recited in claim 4 will be described.

When 10 mm<W1 in regard to the length W1 of the portion of each of the reinforcement layers extending toward the inside bead parts along the reinforcement layers from the return folding points of the reinforcement layers, then the length W1 of the portion of each of the reinforcement layers extending toward the inside bead parts along the reinforcement layers from the return folding points of the reinforcement layers becomes too short; thus, as in a conventional pneumatic tire that does not include the reinforcement layers, the strength of the connection parts between the partition wall parts and the tire inside surface cannot be ensured, and there is the potential for separation to occur at the connection parts between the partition wall parts and the tire inside surface.

Similarly, when 10 mm<W2 in regard to the length W2 of the portion of each of the reinforcement layers extending toward the outside bead parts along the reinforcement layers from the return folding points of the reinforcement layers, then the length W2 of the portion of each of the reinforcement layers extending toward the outside bead parts along the reinforcement layers from the return folding points of the reinforcement layers becomes too short; thus, as in a conventional pneumatic tire that does not include the reinforcement layers, the strength of the connection parts between the partition wall parts and the tire inside surface cannot be ensured, and there is the potential for separation to occur at the connection parts between the partition wall parts and the tire inside surface.

Consequently, when predetermined numerical ranges are, as in the invention recited in claim 4, provided in regard to the length W1 of the portion of each of the reinforcement layers extending toward the inside bead parts along the reinforcement layers from the return folding points of the reinforcement layers and in regard to the length W2 of the portion of each of the reinforcement layers extending toward the outside bead parts along the reinforcement layers from the return folding points of the reinforcement layers, then the strength of the connection parts between the partition wall parts and the tire inside surface can be obtained; thus, separation can be reliably prevented from occurring at the connection parts between the partition wall parts and the tire inside surface.

An invention recited in claim 5 comprises the pneumatic tire of any one of claim 1 to claim 4, wherein outside bead cores that extend along a tire circumferential direction are disposed at the pair of right and left outside bead parts, inside bead cores that are disposed at tire width direction inner sides of the outside bead cores and extend along the tire circumferential direction are disposed at the pair of right and left inside bead parts, a first carcass ply that is configured to toroidally bridge the pair of outside bead cores and both of whose tire width direction end sides are locked to the pair of outside bead cores is disposed in a region ranging from one of the tire side parts to the other of the tire side parts via the tread part, a second carcass ply that is disposed on the tire inner side of the first carcass ply, configured to toroidally bridge the pair of inside bead cores, and both of whose tire width direction end sides are locked to the pair of inside bead cores, is disposed in a region ranging from one of the partition wall parts to the other of the partition wall parts via the tread part, partition wall rubber layers that extend inward in the tire radial direction along the tire outer side of the second carcass ply from the tire inside surface of at least one of the tire side parts and the tread part and whose tire radial direction inside ends are formed so as to contact the rim are disposed at the pair of right and left partition wall parts, and the pair of right and left reinforcement layers are disposed at the tire inner side of the first carcass ply and the tire outer side of the second carcass ply.

Next, the action of the pneumatic tire recited in claim 5 will be described.

In the pneumatic tire recited in claim 5, the pair of right and left reinforcement layers are disposed at the tire inner side of the first carcass ply and the tire outer side of the second carcass ply, and are set so as to continue from the partition wall parts to the tire side parts via the connection parts between the partition wall parts and the tire inside surface.

Consequently, the strength of the connection parts between the partition wall parts and the tire inside surface can be improved by the reinforcement layers, so that even when the tire repeatedly bends in accompaniment with tire rotation, the portion of each of the connection parts between the partition wall parts and the tire inside surface where the first carcass ply is disposed and the portion thereof where the second carcass ply is disposed can be prevented from separating.

Particularly when traveling on an expressway, for example, in a state in which, of the tire air chambers, the internal pressures of the auxiliary air chambers on both tire width direction sides have been made higher than the internal pressure of the main air chamber in the tire width direction center, the force acting such that the portion of each of the connection parts between the partition wall parts and the tire inside surface where the first carcass ply is disposed and the portion thereof where the second carcass ply is disposed separate increases, but according to the invention recited in claim 5, the portion of each of the connection parts between the partition wall parts and the tire inside surface where the first carcass ply is disposed and the portion thereof where the second carcass ply is disposed can be reliably prevented from separating by the reinforcement layers.

An invention recited in claim 6 comprises the pneumatic tire of claim 5, wherein one tire width direction end side of the second carcass ply is rolled up from the tire outer side to the inside at one of the pair of right and left inside bead cores, and the other tire width direction end side of the second carcass ply is rolled up from the tire outer side to the inside at the other of the pair of right and left inside bead cores.

Next, the action of the pneumatic tire recited in claim 6 will be described.

The first carcass ply reinforces the tire side parts (bead parts, side wall parts, tire shoulder parts and tread part), and the second carcass ply reinforces the partition wall parts and the tread part. Because the tire air chamber in the center mainly bears the tension of a belt disposed on the first carcass ply, the internal pressure here is set lower in contrast to the tire air chambers on both sides, whereby a large tread area can be ensured so that, for example, grip power can be improved.

On the other hand, because the tire air chambers on both sides mainly bear the ply tension of the side parts of the tire, the internal pressures here are set higher in contrast to the tire air chamber in the center, whereby the tire lateral rigidity can be raised so that, for example, steering stability can be improved.

Incidentally, if the internal pressures of the tire air chambers on both sides are set higher in contrast to the tire air chamber in the center when a pneumatic tire is used where the width direction ends of the second carcass ply are rolled up from the tire inner side to the outside with respect to the inside bead cores, the partition wall parts become pushed toward the tire center by the difference in pressure, and a force is applied where the bead cores and the rubber below the bead cores try to rotate in the direction of arrow A in FIG. 1 because of cord tension that the internal pressures of the air chambers on both sides apply to the second carcass ply inside the partition wall parts.

Consequently, when the internal pressures of the tire air chambers on both sides are relatively higher than the internal pressure of the tire air chamber in the center and the differential pressure between the tire air chamber in the center and the tire air chambers on both sides becomes larger (e.g., a differential pressure equal to or greater than 50 kPa), then sometimes the partition wall parts come out of their predetermined positions on the rim.

On the other hand, when, as in the invention recited in claim 6, one tire width direction end side of the second carcass ply is rolled up from the tire outer side to the inside at one of the pair of right and left inside bead cores, and the other tire width direction end side of the second carcass ply is rolled up from the tire outer side to the inside at the other of the pair of right and left inside bead cores, then a force is applied where the bead cores and the rubber below the bead cores try to rotate in the direction of arrow B in FIG. 3 because of cord tension that the internal pressures of the air chambers on both sides apply to the second carcass ply inside the partition wall parts.

Consequently, even when the internal pressures of the air chambers on both sides is relatively higher than the internal pressure of the tire air chamber in the center and the differential pressure between the tire air chamber in the center and the tire air chambers on both sides is large, or when the internal pressure of the tire air chamber in the center becomes zero due to rolling over a nail (puncture), the partition wall parts do not come out of their predetermined positions on the rim, and the internal pressures of the tire air chambers on both tire axial direction sides can be maintained.

An invention recited in claim 7 comprises the pneumatic tire of any one of claim 1 to claim 6, wherein when RO represents the inner diameter of the outside bead parts and RI represents the inner diameter of the inside bead parts, TW represents the tread width of the tread part in a flat plane in a state in which the pneumatic tire has been filled with air to a prescribed internal pressure and bears a prescribed load, intersection points between a first hypothetical reference line that extends along the tire side parts and the tread part and passes through thickness direction intermediate points of the tire side parts and the tread part and second hypothetical reference lines that extend along the partition wall parts and pass through thickness direction intermediate points of the partition wall parts are located in the tire side parts and the connection parts between the tread part and the partition wall parts, and KW represents a dimension in the tire width direction between one and the other of the connection parts, TH represents tire height, and KD represents ½ of a dimension equal to the difference when the inner diameter of the outside bead parts is subtracted from the inner diameter of the connection parts, then RO>RI, TW≦KW, and KD≧½TH are satisfied.

It will be noted that the tread width of the tread part is measured by the following prescribed load and prescribed internal pressure.

"Prescribed load" refers to the maximum load (maximum load capacity) of a single wheel of an applied size (ply rating) described in the following standards, and "prescribed internal pressure" refers to air pressure corresponding to the maximum load (maximum load capacity) of a single wheel of an applied size described in the following standards.

The standard is determined by the industrial standard that is valid in the region where the tire is manufactured or used. For example, in the U.S.A., this is prescribed in the Year Book of the Tire and Rim Association, Inc., in Europe, this is prescribed in the Standards Manual of the European Tire and Rim Technical Organization, and in Japan, this is prescribed in the JATMA Year Book of the Japan Automobile Tyre Manufacturers Association.

Next, the action of the pneumatic tire recited in claim 7 will be described.

The pneumatic tire recited in claim 7 is configured to satisfy TW≦KW when TW represents the tread width of the tread part in a flat plane in a state in which the pneumatic tire has been filled with air to a prescribed internal pressure and bears a prescribed load, intersection points between the first hypothetical reference line that extends along the tire side parts and the tread part and passes through thickness direction intermediate points of the tire side parts and the tread part and the second hypothetical reference lines that extend along the partition wall parts and pass through thickness direction intermediate points of the partition wall parts are located in the tire side parts and the connection parts between the tread part and the partition wall parts, and KW represents the dimension in the tire width direction between one and the other of the connection parts.

That is, the tire side parts and the connection parts between the tread part and the partition wall parts are positioned on the normals that pass through the tread ends of the tread part or further outward in the tire width direction.

Because of this configuration, the tire side parts and the connection parts between the tread part and the partition wall parts are separated from the tread part in comparison to a configuration where, as has conventionally been the case, the tire side parts and the connection parts between the tread part and the partition wall parts are positioned at the tire radial direction inner sides of the normals passing through the tread ends of the tread part; thus, the force applied to the partition wall parts from the road surface can be reduced because it becomes difficult for the force from the road surface to spread to the partition wall parts. Consequently, the durability of the tire can be improved in comparison to what has conventionally been the case because damage to the partition wall parts can be prevented.

Further, the pneumatic tire recited in claim 7 is configured to satisfy KD≧½TH when TH represents the tire height and KD represents ½ of a dimension equal to the difference when the inner diameter of the outside bead parts is subtracted from the inner diameter of the connection parts.

That is, the pneumatic tire is configured such that the connection parts are positioned further outward in the tire radial direction than ½ of the tire height TH.

Here, assuming that KD<½TH, then the effect resulting from tripartitioning the tire air chamber becomes unable to be exhibited because the tire air chambers formed by the tire side parts and the partition wall parts become extremely small, but when they are set such that KD≧½TH is satisfied as in the pneumatic tire recited in claim 7, then the tire air chambers formed by the tire side parts and the partition wall parts can be sufficiently ensured, which is preferable.

A tire/rim assembly recited in claim 8 comprises: the pneumatic tire of any one of claim 1 to claim 7; and a rim to which the pneumatic tire attaches, wherein the rim includes a pair of right and left outside bead sheets that contact inner peripheral surfaces of the pair of right and left outside bead parts, a pair of right and left inside bead sheets that are disposed via step parts at rim axial direction inner sides of the pair of right and left outside bead sheets, set to be smaller in diameter than the outside bead sheets, and contact inner peripheral surfaces of the pair of right and left inside bead parts, and a drop that is disposed between one and the other of the pair of right and left inside bead sheets and set to be smaller in diameter than the inside bead sheets.

Next, the action of the tire/rim assembly recited in claim 8 will be described.

By attaching the pneumatic tire of any one of claim 1 to claim 7 to the rim, the inner peripheral surfaces of the bead parts contact the side bead sheets and the inner peripheral surfaces of the partition wall parts contact the inside bead sheets, whereby a tire/rim assembly disposed with three tire air chambers that are independent in the tire axial direction is obtained.

For this reason, even with respect to either a puncture in the tread resulting from rolling over a nail or the like or a puncture in the side parts resulting from curb scraping or the like, the tire air chambers that have not been punctured support the load, so although a slight deterioration of steering stability and increase in vibration harshness accompanies this, travel can be safely continued without problem.

Further, on the rim, there are no hump parts that catch the partition wall parts and worsen workability during rim attachment as in the prior art, and the pneumatic tire can be easily attached because the bead parts and the partition wall parts can be dropped into the drop during rim attachment.

An invention recited in claim 9 comprises the tire/rim assembly of claim 8, wherein of the tire air chambers, the internal pressures of the tire air chambers formed on both tire axial direction sides are set to be higher than the internal pressure of the tire air chamber formed in the tire axial direction center.

Next, the action of the pneumatic tire recited in claim 9 will be described.

When, for example, each of the tire air chambers is at a standard air pressure, thereafter the air inside the tire air chamber in the tire axial direction center is released, and the internal pressures of the tire air chambers on both tire axial direction sides are set to be relatively higher than the internal pressure of the tire air chamber in the tire axial direction center, then the rigidity in the tire longitudinal direction goes down and the tread area goes up, so vibration harshness during travel on bad roads and grip performance during travel on icy and snowy roads can be improved.

Further, because it becomes possible to raise the lateral rigidity and the front-rear rigidity of the tire when the tire air chambers on both tire axial direction sides are filled with air to increase their internal pressures, steering stability can be raised even while alleviating vibration harshness during travel on bad roads and grip performance during travel on icy and snowy roads.

Effects of the Invention

As described above, according to the pneumatic tire or the tire/rim assembly of the present invention, the work of attaching the pneumatic tire to the rim can be ameliorated, and the durability of the connection parts between the partition wall parts and the tire inside surface can be improved.

Further, according to the pneumatic tire of the present invention, because the tire side parts and the connection parts between the tread part and the partition wall parts are positioned on normals passing through the tread ends of the tread part or further outside in the tire width direction, it becomes more difficult for the force from the road surface to spread to the partition wall parts in comparison to a configuration where the tire side parts and the connection parts between the tread part and the partition wall parts are positioned at the tire width direction inner sides of the normals passing through the tread ends of the tread part as has conventionally been the case, so the force applied to the partition wall parts from the road surface can be reduced. Thus, the durability of the tire can be improved in comparison to what has conventionally been the case because damage to the partition wall parts can be prevented.

BRIEF DESCRIPTION OF THE DRAWINGS

FIG. 2B is enlarged diagrams of relevant parts of the tire/rim assembly pertaining to embodiment 1 of the present invention.

FIG. 2C is enlarged diagrams of relevant parts of the tire/rim assembly pertaining to embodiment 1 of the present invention.

BEST MODES FOR IMPLEMENTING THE INVENTION

Embodiment 1

Figure 1:
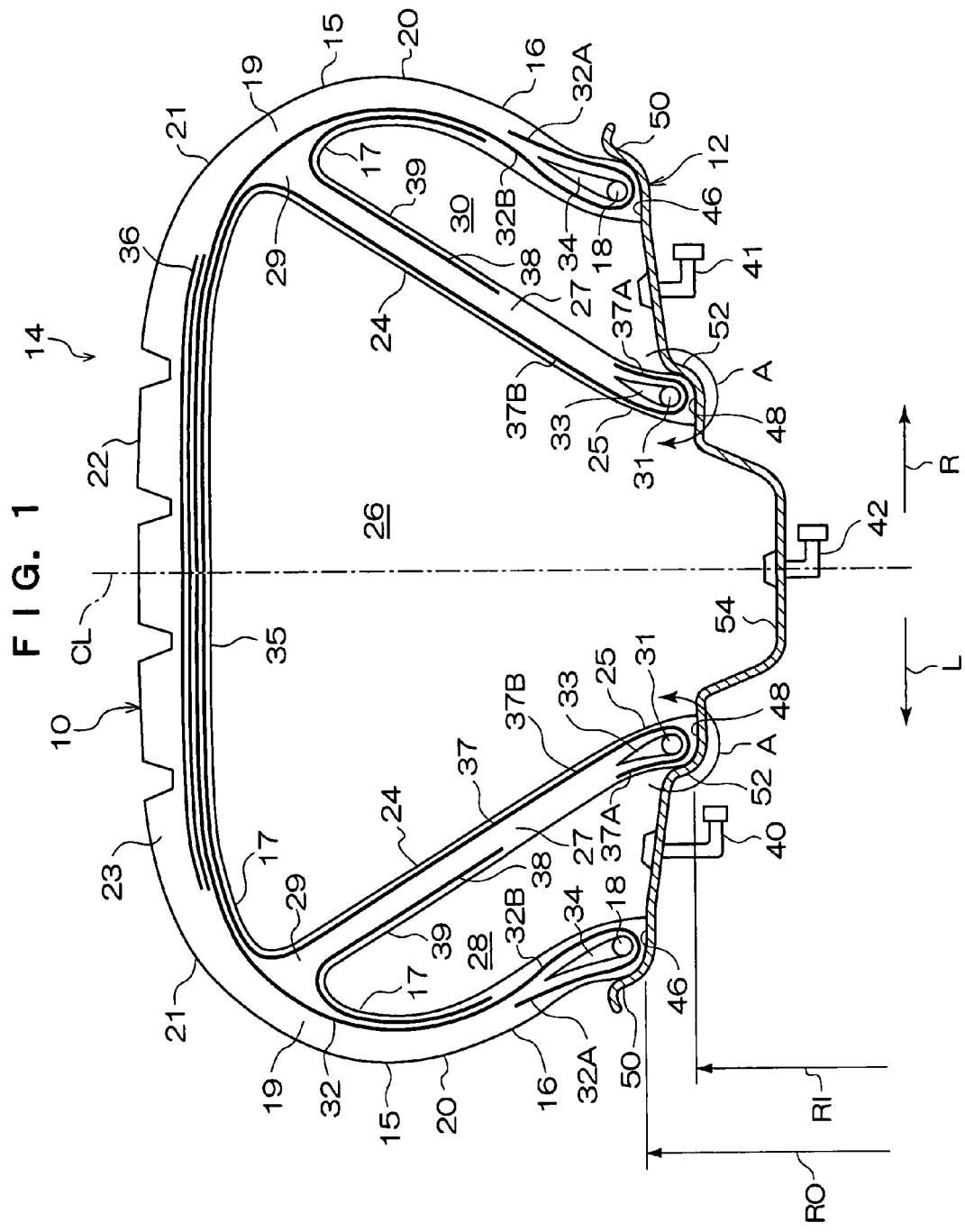
FIG. 1 is a cross-sectional diagram of a tire/rim assembly pertaining to embodiment 1 of the present invention.
Figure 2A:
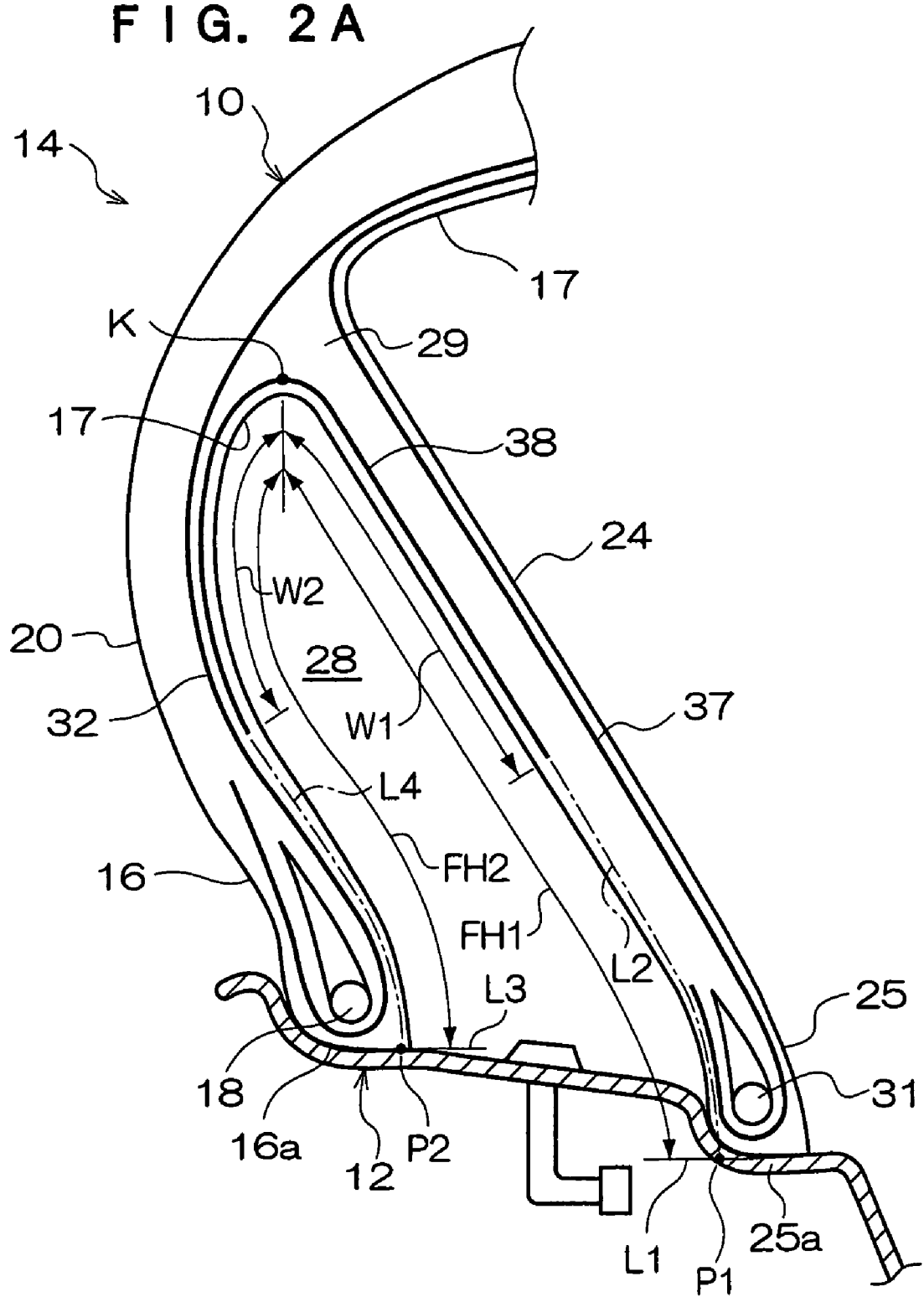
FIG. 2A is enlarged diagrams of relevant parts of the tire/rim assembly pertaining to embodiment 1 of the present invention.

To begin, a tire/rim assembly pertaining to embodiment 1 of the present invention will be described with reference to FIG. 1 and FIG. 2. FIG. 1 and FIG. 2 are diagrams showing embodiment 1 of the present invention, with FIG. 1 being a cross-sectional diagram of the tire/rim assembly where a pneumatic tire (size: 225/55R17) is attached to a rim, and FIG. 2 being enlarged diagrams of relevant parts of FIG. 1.

A pneumatic tire 10 of the present embodiment is preferably used as a tire for a passenger automobile and includes, as its main configuration, outside bead cores 18, inside bead cores 31, a first carcass ply 32, a second carcass ply 37, a tread rubber layer 23, side rubber layers 19, partition wall rubber layers 27, a belt 36, reinforcement layers 38, and inner liners 35 and 39.

The outside bead cores 18 are configured to extend along a tire circumferential direction, and the inside bead cores 31 are disposed at the tire width direction inner sides of the outside bead cores 18 and configured to extend along the tire circumferential direction.

The first carcass ply 32 is configured to toroidally bridge the pair of outside bead cores 18. Both tire width direction end sides of the first carcass ply 32 are rolled up from the tire inner side to the outside on the pair of outside bead cores 18 so as to be locked thereto.

The second carcass ply 37 is disposed on the tire inner side of the first carcass ply 32 and configured to toroidally bridge the pair of inside bead cores 31. Both tire width direction end sides of the second carcass ply 37 are rolled up from the tire inner side to the outside on the pair of inside bead cores 31 so as to be locked thereto.

It will be noted that the first carcass ply 32 and the second carcass ply 37 are configured by carcass plies comprising plural organic fiber cords that have been lined up parallel to each other, such as radially arranged polyester cords or nylon cords, and coated with rubber.

Additionally, the first carcass ply 32 reinforces later-described outside bead parts 16, tire side parts 20 and a tread part 22, and the second carcass ply 37 reinforces later-described partition wall parts 24 and the tread part 22.

The tread rubber layer 23 is disposed on the tire radial direction outer side of the first carcass ply 32 and, in the present embodiment, the tread part 22 is configured on the tire 10 by the tread layer 23. Further, the belt 36 is disposed in the tread part 22 of the pneumatic tire 10 of the present embodiment in a position on the tire radial direction outer side of the first carcass ply 32. The belt 36 is configured from two or more steel cord-mixed layers, for example.

The side rubber layers 19 are disposed at the tire axial direction outer sides of the first carcass ply 32 and, in the present embodiment, the tire side parts 20 are configured on the tire 10 by the side rubber layers 19. The tire side parts 20 are divided into the respective regions of tire shoulder parts 21, side wall parts 15 and the outside bead parts 16.

The outside bead parts 16 of the present embodiment are formed so as to contact outside beat sheets 46 of a rim 12, and outside bead fillers 34 that extend outward in the tire radial direction from the outside bead cores 18 are embedded in the outside bead parts 16 between rollup parts 32A and body parts 32B of the first carcass ply 32.

The partition wall rubber layers 27 are configured so as to extend inward in the tire radial direction along the tire outer side of the second carcass ply 37 from the tire inner sides of the tire shoulder parts 21, and the tire radial direction inside ends of the partition wall rubber layers 27 are formed so as to contact inside bead sheets 48 of the rim 12.

In the present embodiment, because the partition wall rubber layers 27 are formed along the second carcass ply 37 in this manner, the pair of right and left partition wall parts 24 that tripartition in the tire width direction a tire air chamber formed by the tire side parts 20, the tread part 22 and the rim 12 are configured.

That is, in the present embodiment, a main air chamber 26 is formed between the partition wall part 24 and the partition wall part 24, a first auxiliary air chamber 28 is formed between the tire side part 20 and the partition wall part 24 on the arrow L direction side, and a second auxiliary air chamber 30 is formed between the tire side part 20 and the partition wall part 24 on the arrow R direction side.

As mentioned above, the main air chamber 26, the first auxiliary air chamber 28 and the second auxiliary air chamber 30 are respectively independent because the tire radial direction inside ends of inside bead parts 25 tightly contact the rim 12. Further, the inner liner 35 is disposed on the inside surface of the main air chamber 26, and the inner liners 39 are disposed on the inside surfaces of the first auxiliary air chamber 28 and the second auxiliary air chamber 30.

It will be noted that the tire radial direction inside portions of the partition wall parts 24 are formed as the inside bead parts 25 that include the inside bead cores 31. Inside bead fillers 33 that extend outward in the tire radial direction from the inside bead cores 31 are embedded in the inside bead parts 25 between rollup parts 37A and body parts 37B of the second carcass ply 37.

Here, in the present embodiment, the inner diameter of the outside bead parts 16 is formed to be larger than the inner diameter (=rim diameter, same below) of the inside bead parts 25. It is preferable to set these such that when RO represents the inner diameter of the outside bead parts 16 and RI represents the inner diameter of the inside bead parts 25, then 0<RO−RI<50 mm is satisfied.

This is because when RO=RI, a rim disposed with tall hump parts for deterring movement of the partition wall parts outward in the tire axial direction must be used and the attachment work inevitably becomes extremely difficult, and when RO−RI≧50 mm, tire manufacture by current tire manufacturing methods becomes difficult and unrealistic.

Further, when RO−RI≧50 mm, the inner diameter of the inside bead parts becomes too small with respect to the inner diameter of the outside bead parts, and the inner diameter of the rim becomes smaller in accompaniment therewith, which results in the diameter of a brake capable of being attached to the rim inner side becoming smaller. This is not preferable as there is the potential for this to lower vehicle dynamics. Consequently, it is necessary for the inner diameters to satisfy 0<RO−RI<50 mm.

As will be described later, the reinforcement layers 38 are for improving the strength of the connection parts 29 between the partition wall parts 24 and a tire inside surface 17. The reinforcement layers 38 of the present embodiment are disposed at the tire inner side of the first carcass ply 32 and on the tire outer side of the second carcass ply 37, and are disposed so as to continue from the partition wall parts 24 to the tire side parts 20 via the connection parts 29 between the partition wall parts 24 and the tire inside surface 17.

Further, the reinforcement layers 38 of the present embodiment are configured by any of a slanting cord layer, triaxial fabric, or nonwoven fabric, or by a combination of these, for example. The reinforcement layers 38 can of course be configured by an appropriate member other than a slanting cord layer, triaxial fabric, or nonwoven fabric.

Here, as the slanting cord layer, a layer including at least one mixed layer comprising mutually alternating cords, for example, is used.

It is preferable for the fiber used in the slanting cord layer to be one whose elastic modulus is high. Examples of fiber whose elastic modulus is high include steel fiber, aramid fiber, polybenzoxazole fiber, carbon fiber, and glass fiber, but the fiber may also be a fiber other than these. Among these, steel fiber is preferable from the standpoint of effect. Further, the fiber may also be a monofilament or a multifilament (or cord) comprising plural filaments twisted together.

As the triaxial fabric, a fabric comprising two types of warp threads (X-axis threads, Y-axis threads) and woof threads (Z-axis threads) woven in a state in which they intersect at an angle of about 60° is used. It is preferable for the triaxial fabric to be formed by at least one type selected from high rigidity organic fiber, inorganic fiber and metal fiber.

As the nonwoven fabric, polyethylene tephthalate is used.

As the material of the filament fiber configuring the nonwoven fabric, one type or plural types of fiber selected from natural polymer fiber such as cotton, rayon and cellulose, synthetic polymer fiber such as aliphatic polyamide, polyester, polyvinyl alcohol, polyimide and aromatic polyamide, and carbon fiber, glass fiber and steel wire can be mixed.

Additionally, in the present embodiment, as shown in FIG. 2, predetermined ranges are disposed for the length of the reinforcement layers 38. That is, when return folding points K of the reinforcement layers 38 are located in the tire radial direction outermost portions of the reinforcement layer 38 positioned on the connection parts 29 between the partition wall parts 24 and the tire inside surface 17, W1 represents the length of a portion of each of the reinforcement layers 38 extending toward the inside bead parts 25 along the reinforcement layers 38 from the return folding points K of the reinforcement layers 38, W2 similarly represents the length of a portion of each of the reinforcement layers 38 extending toward the outside bead parts 16 along the reinforcement layers 38 from the return folding points K of the reinforcement layers 38, FH1 represents, when the reinforcement layers 38 are hypothetically allowed to extend as far as inside bead part projecting end reference lines L1 that are parallel to the tire rotational axis direction and pass through bead base projecting ends 25$a$ of the inside bead parts 25 along the partition wall parts 24, the length of a portion of each of the partition wall parts 24 ranging from the return folding points K of the reinforcement layers 38 to intersection points P1 between hypothetical extension lines L2 of the reinforcement layers 38 and the inside bead part projecting end reference lines L1, and FH2 represents, when the reinforcement layers 38 are hypothetically allowed to extend as far as outside bead part projecting end reference lines L3 that are parallel to the tire rotational axis direction and pass through bead base projecting ends 16$a$ of the outside bead parts 16 along the tire side parts 20, the length of a portion of each of the tire side parts 20 ranging from the return folding points K of the reinforcement layers 38 to intersection points P2 between hypothetical extension lines L4 of the reinforcement layers 38 and the outside bead part projecting end reference line L3, then it is preferable for 10 mm$\leq$W1$\leq$FH1 and 10 mm$\leq$W2$\leq$FH2 to be satisfied.

Further, more preferably, it is desirable for 30 mm$\leq$W1$\leq$FH1 and 30 mm$\leq$W2$\leq$FH2.

The bead base projecting ends 25$a$ of the inside bead parts 25 in this case are portions (e.g., bead toes of the inside bead parts 25) of bead bases formed on the inside bead parts 25 that project the most inward in the tire radial direction, and the bead base projecting ends 16$a$ of the outside bead parts 16 are portions (e.g., bead toes of the outside bead parts 16) of bead bases formed on the outside bead parts 16 that project the most inward in the tire radial direction.

Here, when 10 mm<W1, then the length W1 of the portion of each of the reinforcement layers 38 extending toward the inside bead parts 25 along the reinforcement layers 38 from the return folding points K of the reinforcement layers 38 becomes too short; thus, similar to a conventional pneumatic tire that does not include the reinforcement layers 38, the strength of the connection parts 29 between the partition wall parts 24 and the tire inside surface 17 cannot be ensured, and there is the potential for the portion of each of the connection parts 29 between the partition wall parts 24 and the tire inside surface 17 where the first carcass ply 32 is disposed and the portion thereof where the second carcass ply 37 is disposed to separate.

Similarly, when 10 mm<W2, then the length W2 of the portion of each of the reinforcement layers 38 extending toward the outside bead parts 16 along the reinforcement layers 38 from the return folding points K of the reinforcement layers 38 becomes too short; thus, similar to a conventional pneumatic tire that does not include the reinforcement layers 38, the strength of the connection parts 29 between the partition wall parts 24 and the tire inside surface 17 cannot be ensured, and there is the potential for the portion of each of the connection parts 29 between the partition wall parts 24 and the tire inside surface 17 where the first carcass ply 32 is disposed and the portion thereof where the second carcass ply 37 is disposed to separate.

Thus, in the present embodiment, as mentioned above, predetermined numerical ranges are provided in regard to the length W1 of the portion of each of the reinforcement layers 38 extending toward the inside bead parts 25 along the reinforcement layers 38 from the return folding points K of the reinforcement layers and in regard to the length W2 of the portion of each of the reinforcement layers 38 extending toward the outside bead parts 16 along the reinforcement layers 38 from the return folding points K of the reinforcement layers 38.

The rim 12 is disposed with a pair of outside bead sheets 46 on which the outside bead parts 16 are disposed and inside bead sheets 48 disposed at the tire axial direction inner sides of the outside bead sheets 46.

The outside bead sheets 46 are formed in accordance with the inner diameter of the outside bead parts 16, and the inside bead sheets 48 are formed in accordance with the inner diameter of the inside bead parts 25. In the present embodiment, as mentioned above, because the inner diameter of the outside bead parts 16 is larger than the inner diameter of the inside bead parts 25, the inside bead sheets 48 are set to be smaller in diameter than the outside bead sheets 46 in accordance therewith.

Flanges 50 that serve the role of preventing the outside bead parts 16 from being pushed outward in the tire width direction are formed on the axial direction outer sides of the outside bead sheets 46, and step parts 52 that serve the role of preventing the inside bead parts 25 from being pushed outward in the tire width direction are formed between the inside bead sheets 48 and the outside bead sheets 46.

Further, a drop part (well) 54 whose core diameter is configured to be smaller than that of the inside bead sheets 48 is disposed in the axial direction center of the rim 12.

It will be noted that disposed in the rim 12 are a first air valve 40 for filling the first auxiliary air chamber 28 with air, a second air valve 41 for filling the second auxiliary air chamber 30 with air, and a third air valve 42 for filling the main air chamber 26 with air.

Next, the action of the present embodiment will be described.

First, in the rim 12 of the present embodiment, the inner diameter RO of the outside bead parts 16 is set to be larger than the inner diameter RI of the inside bead parts 25, and the drop 54 is disposed between them, so when the pneumatic tire 10 is to be attached, the outside bead parts 16 and the inside bead parts 25 can be dropped into the drop 54 and, similar to the attachment of a conventional common pneumatic tire, the work of attaching the pneumatic tire 10 to the rim 12 becomes easy.

Further, the step parts 52 that deter movement of the inside bead parts 25 outward in the tire width direction are formed, by the difference in the diameters of the outside bead sheets 46 and the inside bead sheets 48, between the outside bead sheets 46 to which the outside bead parts 16 attach and the inside bead sheets 48 to which the inside bead parts 25 attach, so it is not necessary to form, on the tire width direction outer sides of the inside bead parts 25, tall hump parts onto which the inside bead parts 25 catch during rim attachment and which worsen workability, and rim attachment becomes easy.

Further, in a tire/rim assembly 14 of the present embodiment, the first auxiliary air chamber 28, the main air chamber 26 and the second auxiliary air chamber 30 partitioned by the partition wall parts 24 are formed in the tire width direction between the pneumatic tire 10 and the rim 12, so that even with respect to either a puncture in the tread resulting from the tread part 22 rolling over a nail or the like or a puncture in the tire side parts 20 resulting from curb scraping or the like, the other two air chambers that have not been punctured support the load, so although some drop in the tire height and a slight deterioration of steering stability and increase in vibration harshness accompanies this, travel can be safely continued without problem.

Here, the internal pressure of the first auxiliary air chamber 28, the internal pressure of the second auxiliary air chamber 30 and the internal pressure of the main air chamber 26 may be the same or mutually different. The internal pressure of the first auxiliary air chamber 28, the internal pressure of the second auxiliary air chamber 30 and the internal pressure of the main air chamber 26 can be set to all different arbitrary pressures.

For example, by making the internal pressure of the first auxiliary air chamber 28, the internal pressure of the second auxiliary air chamber 30 and the internal pressure of the main air chamber 26 the same, characteristics that are the same as those of a conventional pneumatic tire are obtained.

Further, when the air inside the main air chamber 26 is released from a state where the internal pressures of the three air chambers have been set to be the same as described above and the internal pressure of the main air chamber 26 is caused to be lower than the internal pressure of the first auxiliary air chamber 28 and the internal pressure of the second auxiliary air chamber 30, the rigidity in the tire longitudinal direction goes down and the tread area goes up, so vibration harshness during travel on bad roads and grip performance during travel on icy and snowy roads can be improved.

Moreover, because it becomes possible to raise the lateral rigidity and the front-rear rigidity of the tire when the first auxiliary air chamber 28 and the second auxiliary air chamber 30 are filled with air to increase their internal pressures, steering stability can be raised even while alleviating vibration harshness during travel on bad roads and grip performance during travel on icy and snowy roads.

Further, disposed in the pneumatic tire 10 of the present embodiment are the pair of right and left reinforcement layers 38 that are disposed at the tire inner side of the first carcass ply 32 and the tire outer side of the second carcass ply 37 such that the reinforcement layers 38 continue from the partition wall parts 24 to the tire side parts 20 via the connection parts 29 between the partition wall parts 24 and the tire inside surface 17.

Consequently, the strength of the connection parts 29 between the partition wall parts 24 and the tire inside surface 17 can be improved, so that even when the tire repeatedly bends in accompaniment with tire rotation, the portion of each of the connection parts between the partition wall parts and the tire inside surface where the first carcass ply is disposed and the portion thereof where the second carcass ply is disposed can be prevented from separating. In this manner, according to the pneumatic tire of the present embodiment, the durability of the connection parts 29 between the partition wall parts 24 and the tire inside surface 17 can be improved by providing the reinforcement layers 38.

Particularly when traveling on an expressway, for example, in a state in which, of the tire air chambers, the internal pressures of the first auxiliary air chamber 28 and the second auxiliary air chamber 30 on both tire width direction sides have been made higher than the internal pressure of the main air chamber 26 in the tire width direction center, the strength of the connection parts 29 between the partition wall parts 24 and the tire inside surface 17 is improved by the reinforcement layers 38, whereby separation of the portion of each of the connection parts between the partition wall parts and the tire inside surface where the first carcass ply is disposed and the portion thereof where the second carcass ply is disposed can be controlled. In this manner, durability during high-speed travel can also be improved remarkably in comparison to what has conventionally been the case.

Embodiment 2

Figure 3:
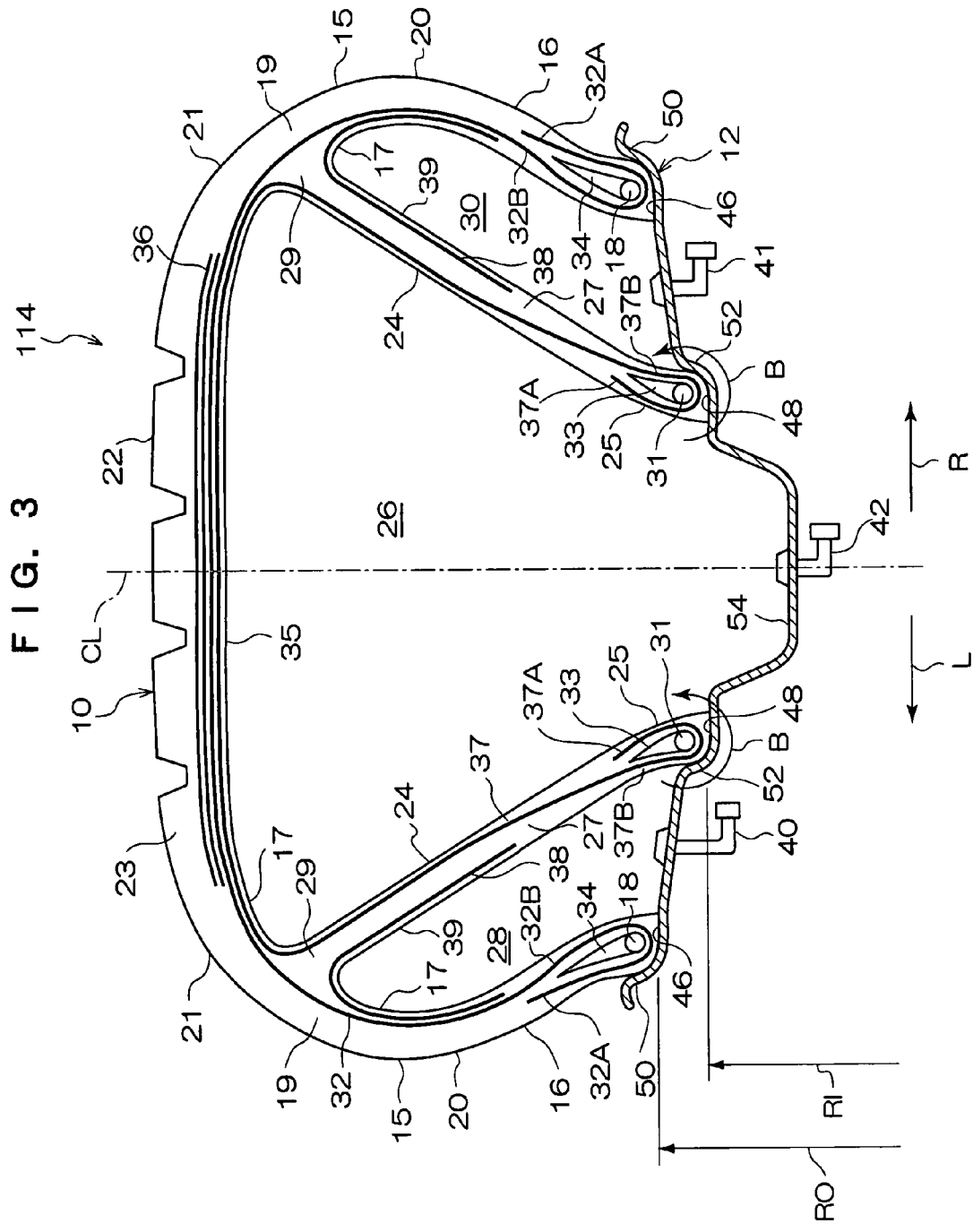
FIG. 3 is a cross-sectional diagram of a tire/rim assembly pertaining to embodiment 2 of the present invention.

Next, a tire/rim assembly pertaining to embodiment 2 of the present invention will be described with reference to FIG. 3. FIG. 3 is a diagram showing embodiment 2 of the present invention and is a cross-sectional diagram showing the configuration of a tire/rim assembly where a pneumatic tire (size: 225/55R17) is attached to a rim. It will be noted that the same reference numerals will be given to configurations that are the same as those in embodiment 1 and that description thereof will be omitted.

As shown in FIG. 3, in the present embodiment, both tire width direction end sides of the second carcass ply 37 are rolled up from the tire outer side to the inner side on the pair of inside bead cores 31 so as to be locked thereto. The remaining configuration is the same as that of embodiment 1.

When both width direction end sides of the second carcass ply are rolled up from the tire outer side to the inner side with respect to the inside bead cores 31 in this manner, a force where the inside bead cores 31 and the rubber under the inside bead cores 31 try to rotate in the direction of arrow B in FIG. 3 is applied due to cord tension that the internal pressures of the first auxiliary air chamber 28 and the second auxiliary air chamber 30 apply to the second carcass ply 37 inside the adjacent partition wall parts 24.

Consequently, even when the internal pressure of the main air chamber 26 is relatively higher than the internal pressure of the first auxiliary air chamber 28 and the internal pressure of the second auxiliary air chamber 30, or when the internal pressure of the main air chamber 26 becomes zero due to a puncture or the like, the partition wall parts 24 do not come out of their predetermined positions on the rim 12, and the internal pressure of the first auxiliary air chamber 28 and the internal pressure of the second auxiliary air chamber 30 can be maintained. Other action and effects are the same as those of embodiment 1.

Next, test examples will be described.

In order to verify the effects of the present invention, one type of tire/rim assembly of a first comparative example (see FIG. 4), two types of tire/rim assemblies pertaining to a second comparative example (see FIG. 1), and four types of tire/rim assemblies of embodiments (1 to 4) to which the present invention was applied were prepared and a high-speed durability test was performed.

Figure 4:
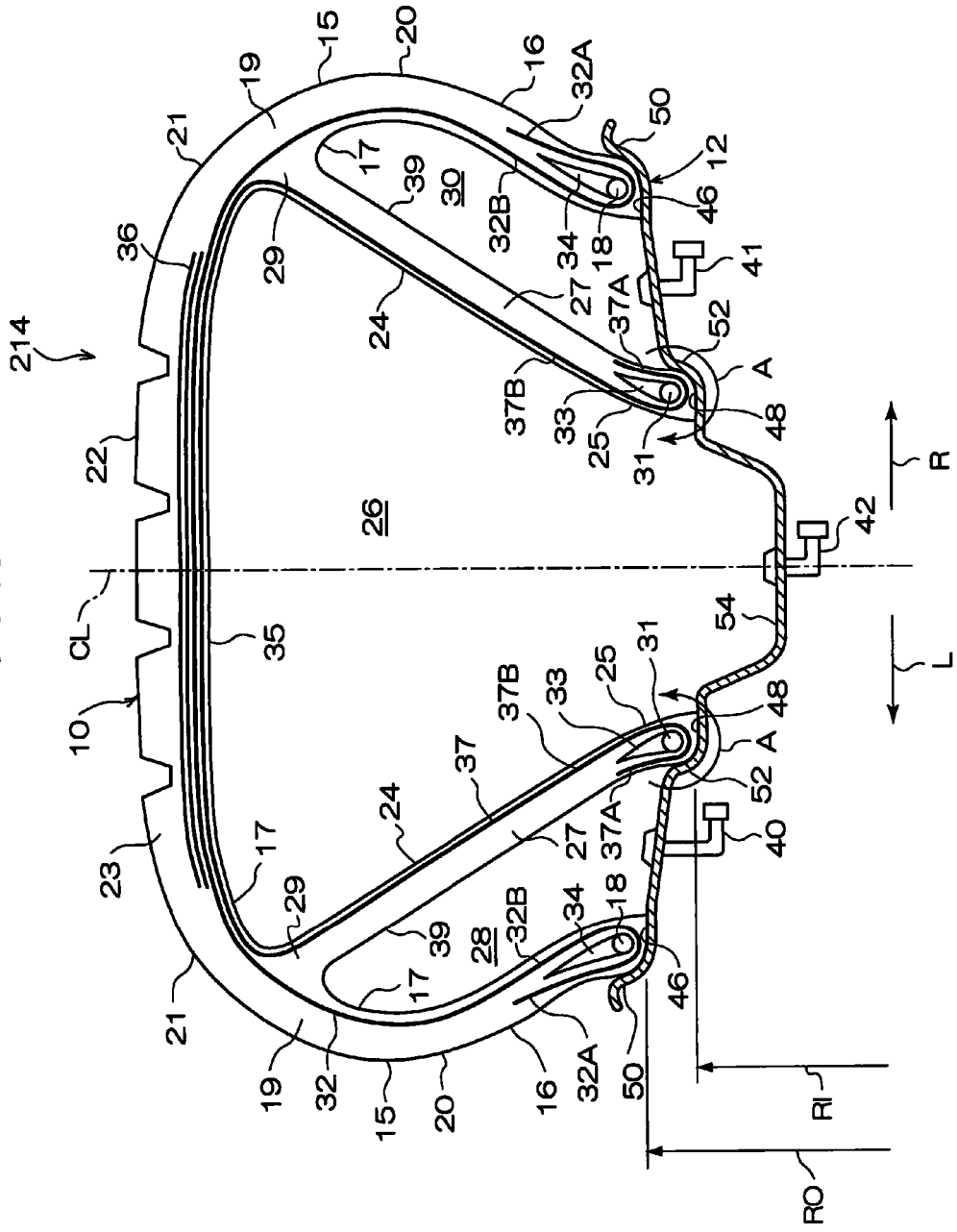
FIG. 4 is a cross-sectional diagram of a tire/rim assembly pertaining to a comparative example.

A tire/rim assembly 214 of the first comparative example shown in FIG. 4 was one where the reinforcement layers 38 were omitted from the tire/rim assembly 14 of the present embodiment, and the remaining configuration was the same as that of the tire/rim assembly of the present embodiment.

The tire/rim assemblies pertaining to the second comparative example included the reinforcement layers 38 similarly to the present embodiment, but the length W1 of the portion of each of the reinforcement layers 38 extending toward the inside bead parts 25 along the reinforcement layers 38 from the return folding points K of the reinforcement layers 38 was 7 mm in comparative example 1 and 7 mm in comparative example 2, and the width W2 of the portion of each of the reinforcement layers 38 extending toward the outside bead parts 16 along the reinforcement layers 38 from the return folding points K of the reinforcement layers 38 was 7 mm in comparative example 1 and 30 mm in comparative example 2. That is, the lengths of the reinforcement layers 38 in the tire/rim assemblies pertaining to the second comparative example were outside the numerical ranges of the present invention.

The high-speed durability test was performed on the basis of high-speed performance test B of the JIS standard, and 100 was used as the high-speed durability index and represented the failure speed of the tire/rim assembly of the first comparative example. That is, the malfunction limit speed was higher the greater the index was, and indicated that the tire was one whose durability at high-speed travel was good. The test tires were for a passenger vehicle and the sizes of all were 225/55R17. The results of the high-speed durability test are shown in Table 1.

TABLE 1

|  | First Comparative Example | Second Comparative Example 1 | Second Comparative Example 2 | Embodiment 1 | Embodiment 2 | Embodiment 3 | Embodiment 4 |
|---|---|---|---|---|---|---|---|
| Figure | FIG. 4 | see FIG. 1 | see FIG. 1 | FIG. 1 | FIG. 1 | FIG. 1 | FIG. 1 |
| Main Air Chamber Internal Pressure (kPa) | 180 | ← | ← | ← | ← | ← | ← |
| Auxiliary Air Chamber 1 Internal Pressure (kPa) | 220 | ← | ← | ← | ← | ← | ← |
| Auxiliary Air Chamber 2 Internal Pressure (kPa) | 220 | ← | ← | ← | ← | ← | ← |
| FH1 (mm) | 120 | ← | ← | ← | ← | ← | ← |
| FH2 (mm) | 130 | ← | ← | ← | ← | ← | ← |
| W1 (mm) | None | 7 | 7 | 13 | 30 | 50 | 110 |
| W2 (mm) | None | 7 | 30 | 13 | 30 | 40 | 110 |
| High-Speed Durability Index | 100 | 100 | 100 | 103 | 115 | 125 | 128 |

From Table 1, because the lengths of the reinforcement layers 38 in the tire/rim assemblies of second comparative examples 1 and 2 were outside the numerical ranges of the present invention, the strength of the connection parts 29 between the partition wall parts 24 and the tire inside surface 17 could not be ensured, and their high-speed durability stayed the same as that of the first comparative example that did not include the reinforcement layers 38.

In contrast, because the lengths of the reinforcement layers 38 in the tire/rim assemblies 14 of the embodiments (1 to 4) were sufficient, the strength of the connection parts 29 between the partition wall parts 24 and the tire inside surface 17 could be sufficiently ensured, and their high-speed durability improved in comparison to the first and second comparative examples.

Further, it became apparent that in the tire/rim assemblies 14 of the embodiments (1 to 4), the strength of the connection parts 29 between the partition wall parts 24 and the tire inside surface 17 could be raised even more as the lengths of the reinforcement layers 38 were lengthened, and their high-speed durability could be improved.

Embodiment 3

Figure 5:
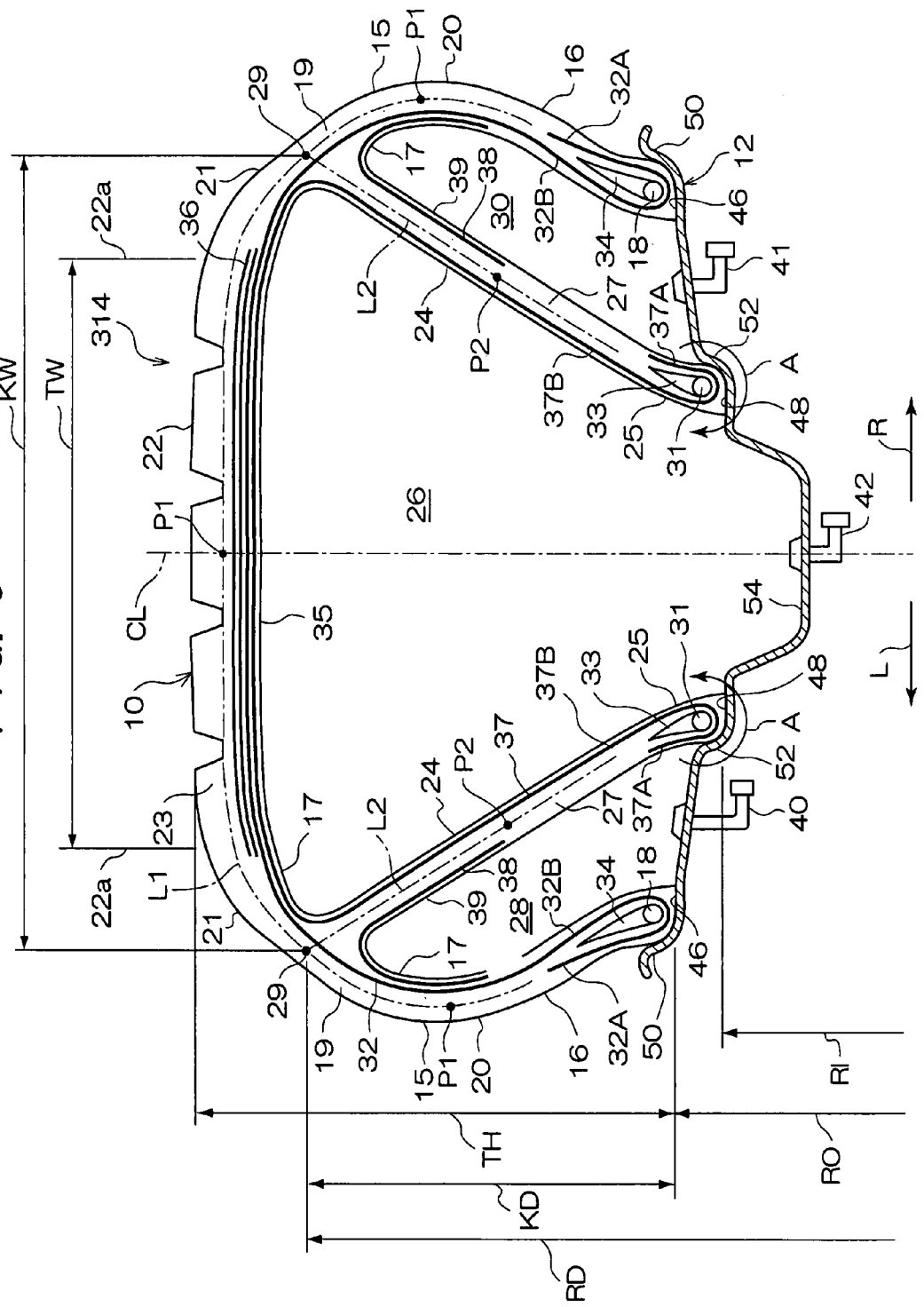
FIG. 5 is a cross-sectional diagram of a tire/rim assembly pertaining to embodiment 3 of the present invention.

Next, a tire/rim assembly pertaining to embodiment 3 of the present invention will be described. FIG. 5 is a diagram showing embodiment 3 of the present invention and is a cross-sectional diagram showing the configuration of a tire/rim assembly where a pneumatic tire (size: 225/55R17) is attached to a rim. It will be noted that the same reference numerals will be given to configurations that are the same as those in embodiments 1 and 2 and that description thereof will be omitted.

The pneumatic tire 10 of the present embodiment is configured such that when TW represents the tread width of the tread part 22 in a flat plane in a state in which the pneumatic tire has been filled with air to a prescribed internal pressure and bears a prescribed load, intersection points between a first hypothetical reference line L1 that extends along the tire side parts 20 and the tread part 22 and passes through thickness direction intermediate points P1 of the tire side parts 20 and the tread part 22 and second hypothetical reference lines L2 that extend along the partition wall parts 24 and pass through thickness direction intermediate points P2 of the partition wall parts 24 are located in the tire side parts 20 and the connection parts 29 between the tread part 22 and the partition wall parts 24, and KW represents a dimension in the tire width direction between one and the other of the connection parts 29, then TW≦KW is satisfied.

That is, the tire side parts 20 and the connection parts 29 between the tread part 22 and the partition wall parts 24 are positioned on normals 22a that pass through the tread ends of the tread part 22 or further outward in the tire width direction.

It will be noted that the tread width of the tread part 22 is measured by the following prescribed load and prescribed internal pressure.

"Prescribed load" refers to the maximum load (maximum load capacity) of a single wheel of an applied size (ply rating) described in the following standards, and "prescribed internal pressure" refers to air pressure corresponding to the maximum load (maximum load capacity) of a single wheel of an applied size described in the following standards.

The standard is determined by the industrial standard that is valid in the region where the tire is manufactured or used. For example, in the U.S.A., this is prescribed in the Year Book of the Tire and Rim Association, Inc., in Europe, this is prescribed in the Standards Manual of the European Tire and Rim Technical Organization, and in Japan, this is prescribed in the JATMA Year Book of the Japan Automobile Tyre Manufacturers Association.

Moreover, in the pneumatic tire 10 of the present embodiment, the values are set such that when TH represents the tire height and KD represents ½ of a dimension equal to the difference when the inner diameter of the outside bead parts 16 is subtracted from the inner diameter RD of the connection parts 29, then KD≧½TH is satisfied.

That is, the pneumatic tire is configured such that the connection parts 29 are positioned further outward in the tire radial direction than ½ of the tire height TH.

Here, assuming that KD<½TH, then the effect resulting from tripartitioning the tire air chamber becomes unable to be exhibited because the first auxiliary air chamber 28 and the second auxiliary air chamber 30 formed by the tire side parts 20 and the partition wall parts 24 become extremely small, but when they are set such that KD≧½TH is satisfied as in the present embodiment, then the first auxiliary air chamber 28 and the second auxiliary air chamber 30 formed by the tire side parts 20 and the partition wall parts 24 can be sufficiently ensured, which is preferable.

Next, the action of the present embodiment will be described.

As mentioned above, the pneumatic tire 10 of the present embodiment is configured to satisfy TW≦KW when TW represents the tread width of the tread part 22 in a flat plane in a state in which the pneumatic tire has been filled with air to a prescribed internal pressure and bears a prescribed load, intersection points between the first hypothetical reference line L1 that extends along the tire side parts 20 and the tread part 22 and passes through thickness direction intermediates points P1 of the tire side parts 20 and the tread part 22 and the second hypothetical lines L2 that extend along the partition wall parts 24 and pass through thickness direction intermediate points P2 of the partition wall parts 24 are located in the tire side parts 20 and the connection parts 29 between the tread part 22 and the partition wall parts 24, and KW represents the dimension in the tire width direction between one and the other of the connection parts 29.

That is, the tire side parts 20 and the connection parts 29 between the tread part 22 and the partition wall parts 24 are positioned on the normals 22a that pass through the tread ends of the tread part 22 or further outward in the tire width direction.

Because of this configuration, the tire side parts 20 and the connection parts 29 between the tread part 20 and the partition wall parts 24 are separated from the tread part 22 in comparison to a configuration where, as has conventionally been the case, the tire side parts 20 and the connection parts 29 between the tread part 22 and the partition wall parts 24 are positioned at the tire radial direction inner sides of the normals 22a passing through the tread ends of the tread part 22; thus, the force applied to the partition wall parts 24 from the road surface can be reduced because it becomes difficult for the force from the road surface to spread to the partition wall parts 24. Consequently, the durability of the tire can be improved in comparison to what has conventionally been the case because damage to the partition wall parts 24 can be prevented.

Further, in the present embodiment, because the values are set to satisfy KD≧½TH when TH represents the tire height and KD represents ½ of a dimension equal to the difference when the inner diameter RO of the outside bead parts 16 is subtracted from the inner diameter RD of the connection parts 29, the first auxiliary air chamber 28 and the second auxiliary air chamber 30 formed by the tire side parts 20 and the partition wall parts 24 can be sufficiently ensured.

Embodiment 4

Figure 6:
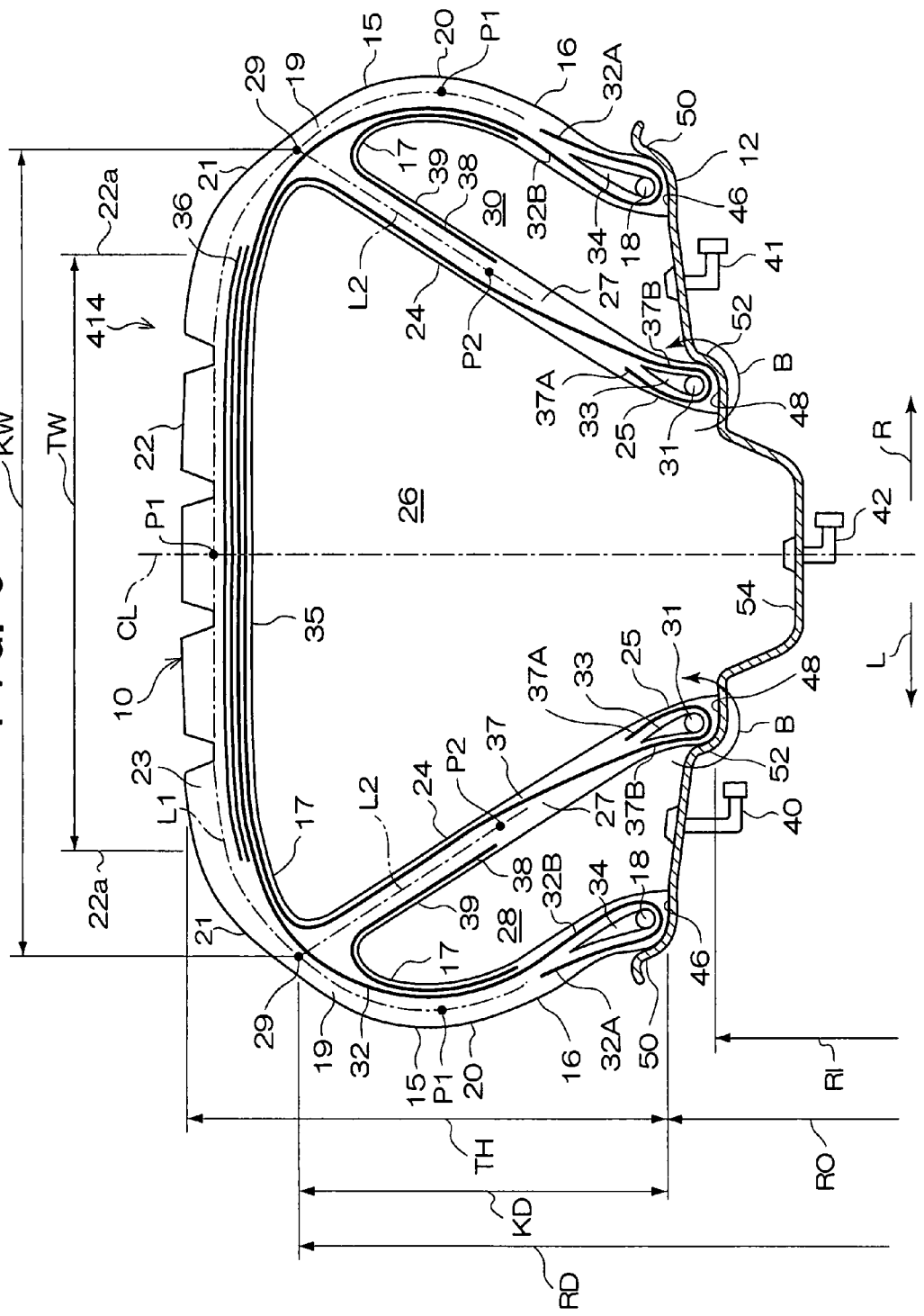
FIG. 6 is a cross-sectional diagram of a tire/rim assembly pertaining to embodiment 4 of the present invention.

Next, a tire/rim assembly pertaining to embodiment 4 of the present invention will be described with reference to FIG. 6. FIG. 6 is a diagram showing embodiment 4 of the present invention and is a cross-sectional diagram showing the configuration of a tire/rim assembly where a pneumatic tire (size: 225/55R17) is attached to a rim. It will be noted that the same reference numerals will be given to configurations that are the same as those in embodiment 3 and that description thereof will be omitted.

As shown in FIG. 6, in the present embodiment, both tire width direction end sides of the second carcass ply 37 are rolled up from the tire outer side to the inner side on the pair of inside bead cores 31 and locked thereto. The remaining configuration is the same as that of embodiment 3.

When both tire width direction end sides of the second carcass ply are rolled up from the tire outer side to the inner side with respect to the inside bead cores 31 in this manner, a force where the inside bead cores 31 and the rubber under the inside bead cores 31 try to rotate in the direction of arrow B in FIG. 6 is applied by cord tension that the internal pressures of the first auxiliary air chamber 28 and the second auxiliary air chamber 30 apply to the second carcass ply 37 inside the adjacent partition wall parts 24.

Consequently, even when the internal pressure of the main air chamber 26 is relatively higher than the internal pressure of the first auxiliary air chamber 28 and the internal pressure of the second auxiliary air chamber 30, or when the internal pressure of the main air chamber 26 becomes zero due to a puncture or the like, the partition wall parts 24 do not come out of their predetermined positions on the rim 12, and the internal pressure of the first auxiliary air chamber 28 and the internal pressure of the second auxiliary air chamber 30 can be maintained. Other action and effects are the same as those of embodiment 3.

Next, test examples will be described.

In order to verify the effects of the present invention, one type of a tire/rim assembly 714 of a conventional example (see FIG. 9), one type each of tire/rim assemblies 514 and 614 pertaining to comparative examples (see FIG. 7 and FIG. 8), and four types of tire/rim assemblies 314 and 414 of embodiments (1 to 4) to which the present invention was applied (see FIG. 5 and FIG. 6) were prepared and a high-speed durability test was performed.

Figure 9:
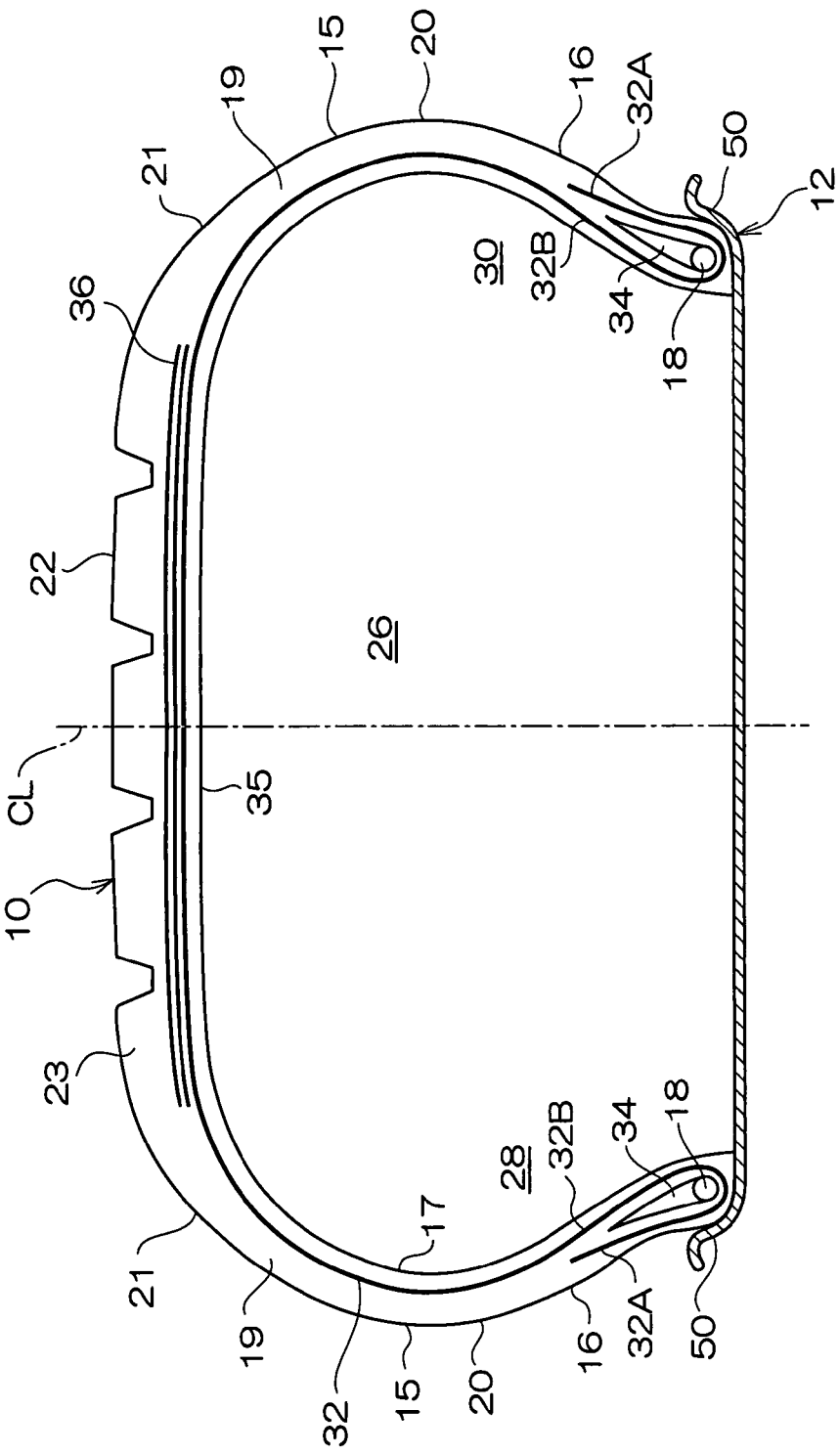
FIG. 9 is a cross-sectional diagram of a tire/rim assembly pertaining to a conventional example.

The tire/rim assembly 714 of the conventional example shown in FIG. 9 was one where the partition wall parts 24 and the second carcass ply 37 were omitted from the tire/rim assemblies 314 and 414 of the present embodiment, and the remaining configuration was the same as that of the tire/rim assemblies 314 and 414 of the present embodiment.

Figure 7:
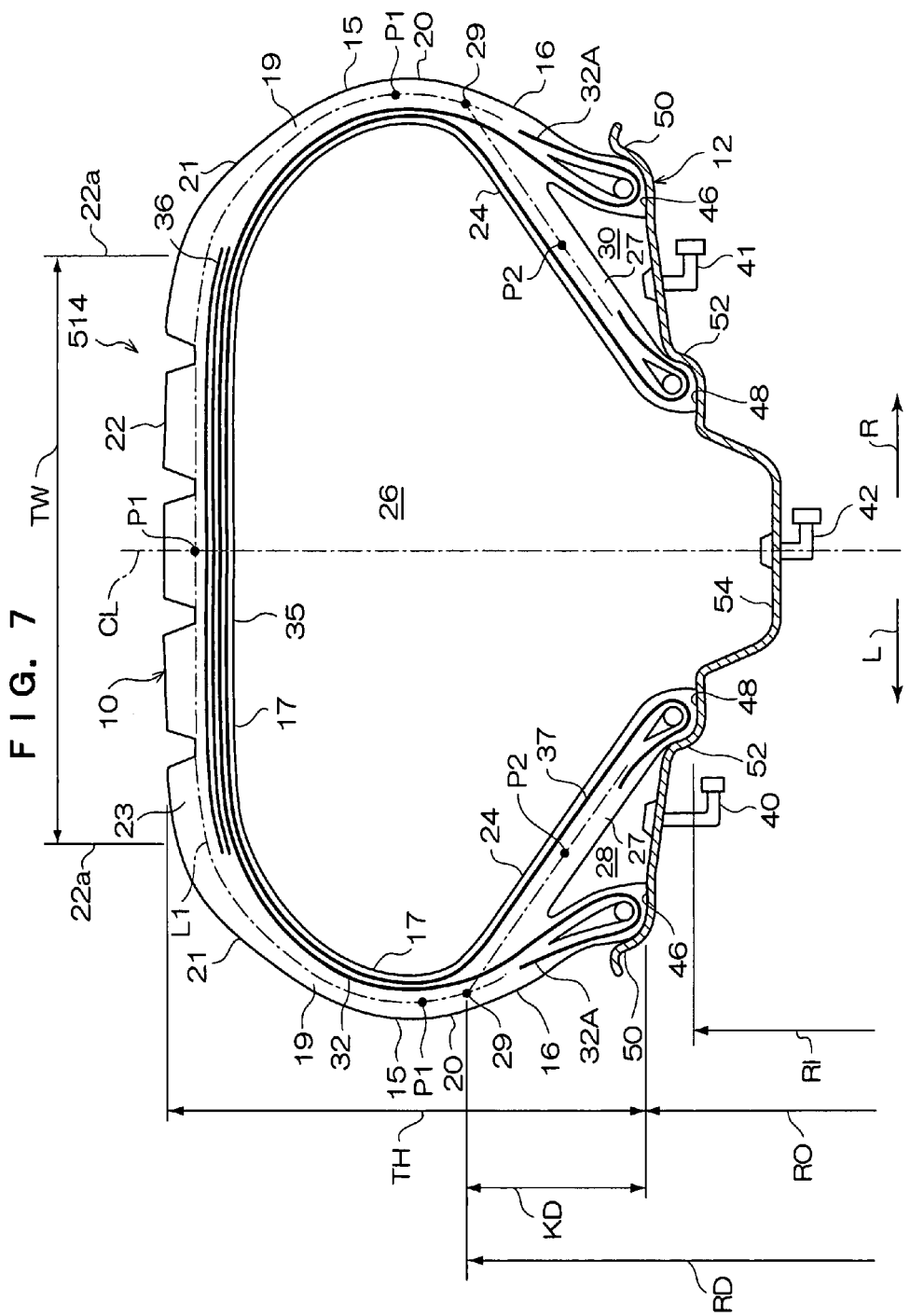
FIG. 7 is a cross-sectional diagram of a tire/rim assembly pertaining to a comparative example.

Further, the tire/rim assembly 514 pertaining to comparative example 1 shown in FIG. 7 included the partition wall parts 24 similarly to the present embodiment, but the tire/rim assembly 514 pertaining to the comparative example was configured such that the relationship between the tire height TH and the dimension KD was KD<½TH.

That is, the tire/rim assembly 514 pertaining to comparative example 1 was configured such that the connection parts 29 were positioned further inward in the tire radial direction than ½ of the tire height TH, and the relationship between the tire height TH and the dimension KD was outside the numerical range of the present invention.

Figure 8:
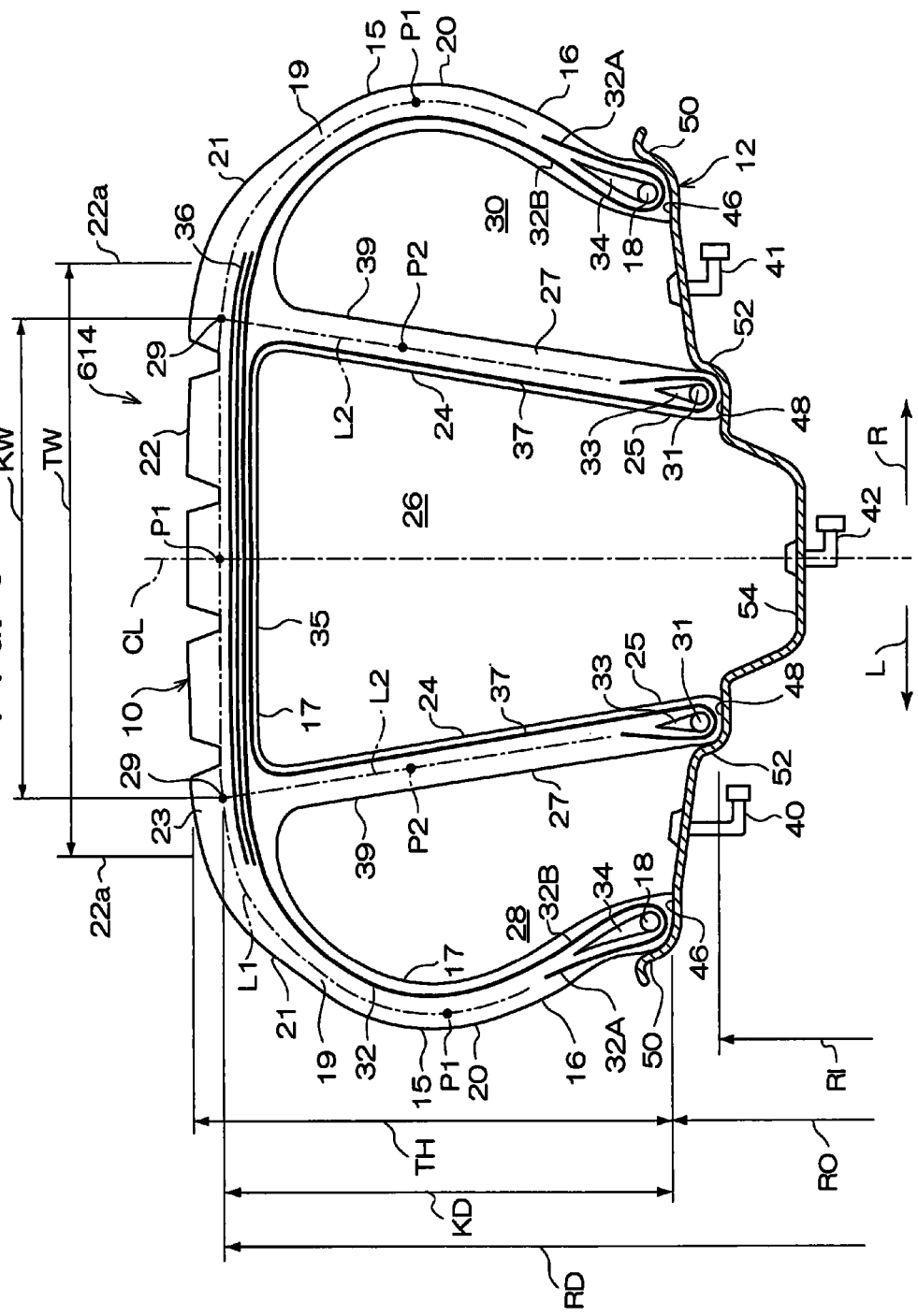
FIG. 8 is a cross-sectional diagram of a tire/rim assembly pertaining to a comparative example.

Further, the tire/rim assembly 614 pertaining to comparative example 2 shown in FIG. 8 included the partition wall parts 24 similarly to the present embodiment, but the tire/rim assembly 614 pertaining to the comparative example was configured such that the relationship between the tread width TW of the tread part 22 in a flat plane in a state in which the pneumatic tire was filled to a prescribed internal pressure and carried a prescribed load and the dimension KW in the tire width direction between one and the other of the connection parts 29 was TW>KW.

That is, in the tire/rim assembly 614 pertaining to comparative example 2, the tire side parts 20 and the connection parts 29 between the tread part 22 and the partition wall parts 24 were positioned inside the tread of the tread part 22, and the relationship between the tread width TW and the dimension KW was outside the numerical range of the present invention.

In order to verify the affects that TW, TH, KD and KW exert on tire durability, the test was performed using configurations where the reinforcement layers 38 were omitted from each tire.

Vertical rigidity and lateral rigidity were measured by applying a 570 kg load to each tire. In regard to the vertical rigidity index, 100 was used for the conventional example to express the inverse of each measured value. That is, vertical rigidity became smaller as the index became larger, which indicated a good tire.

Further, in regard to the lateral rigidity index, 100 was used for the conventional example to express each measured value. That is, lateral rigidity became larger as the index became larger, which indicated a good tire.

The high-speed durability test was performed on the basis of high-speed performance test B of the JIS standard, and for the high-speed durability index, 100 was used to represent the failure speed of the conventional tire/rim assembly. That is, the failure limit speed was higher the greater the index was, and indicated that the tire was one whose durability at high-speed travel was good. The test tires were for a passenger vehicle and the sizes of all were 225/55R17. The results of the high-speed durability test are shown in Table 2.

TABLE 2

|  | Conventional Example | Comparative Example 1 | Comparative Example 2 | Embodiment 1 | Embodiment 2 | Embodiment 3 | Embodiment 4 |
|---|---|---|---|---|---|---|---|
| Figure | FIG. 9 | FIG. 7 | FIG. 8 | FIG. 5 | FIG. 5 | FIG. 6 | FIG. 6 |
| Main Air Chamber Internal Pressure (kPa) | 180 | 180 | ← | ← | ← | ← | ← |
| Auxiliary Air Chamber 1 Internal Pressure (kPa) | — | 220 | ← | ← | ← | ← | ← |
| Auxiliary Air Chamber 2 Internal Pressure (kPa) | — | 220 | ← | ← | ← | ← | ← |
| TW (mm) | 180 | ← | ← | ← | ← | ← | ← |
| TH (mm) | 125 | ← | ← | ← | ← | ← | ← |
| KD (mm) | — | 57.5 | 105 | 67.5 | 95 | 95 | 100 |
| KW (mm) | — | 220 | 170 | 220 | 200 | ← | 185 |
| Vertical Rigidity Index | 100 | 102 | 98 | 101 | 101 | 101 | 100 |
| Lateral Rigidity Index | 100 | 97 | 106 | 105 | 110 | 110 | 106 |
| High-Speed Durability Index | 100 | 101 | 95 | 110 | 105 | 105 | 100 |

The tire/rim assembly 514 of comparative example 1 was configured such that KD<½TH, and the relationship between the tire height TH and the dimension KD was outside the numerical range of the present invention. Thus, as shown in Table 2, although the tire/rim assembly 514 of comparative example 1 had excellent vertical rigidity, its lateral rigidity was inferior to conventionally because the volumes of the first auxiliary air chamber 28 and the second auxiliary air chamber 30 could not be ensured, and its high-speed durability stayed similar to that of the conventional tire/rim assembly 714.

In the tire/rim assembly 614 of comparative example 2, the tire side parts 20 and the connection parts 29 between the tread part 22 and the partition wall parts 24 were positioned inside the tread of the tread part 22, and the relationship between the tread width TW and the dimension KW was outside the numerical range of the present invention. Thus, the force from the road surface easily spread to the partition wall parts 24, so as shown in Table 2, although the tire/rim assembly 614 of comparative example 2 had excellent lateral rigidity, its vertical rigidity was inferior to conventionally, and overall its high-speed durability was inferior to that of the tire/rim assembly 714 of the conventional example.

In contrast, in the tire/rim assemblies 314 and 314 of the embodiments (1 to 4), the tire side parts 20 and the connection parts 29 between the tread part 22 and the partition wall parts 24 were positioned at the tire width direction outer sides of the tread of the tread part 22 and it was difficult for the force from the road surface to spread to the partition wall parts 24, so the force acting on the partition wall parts 24 from the road surface could be reduced. For this reason, as shown in Table 2, in the tire/rim assemblies 314 and 414 of the embodiments (1 to 4), the high-speed durability of the tire in each was superior in comparison to that of the tire/rim assembly 714 of the conventional example.

Further, as shown in Table 2, it became apparent that in the tire/rim assemblies 314 and 414 of the embodiments (1 to 4), the high-speed durability of the tires improved as the dimension KW in the tire width direction between one and the other of the connection parts 29 was made larger than the tread width TW of the tread part 22.

Moreover, in the tire/rim assemblies 314 and 414 of the embodiments (1 to 4), vertical rigidity in each became smaller in comparison to that of the tire/rim assembly 714 pertaining to the conventional example and lateral rigidity in each became larger in comparison to that of the tire/rim assembly 714 pertaining to the conventional example. Thus, it became apparent that the tires in the tire/rim assemblies 314 and 414 of the embodiments (1 to 4) had a good rigidity balance in comparison to that of the tire/rim assembly 714 pertaining to the conventional example.

INDUSTRIAL APPLICABILITY

The present invention has the above configuration, may be used as a tire for a passenger automobile as described above, is also applicable to large vehicles such as trucks and also airplanes, and its utilization range is extremely wide.

Description of the Reference Numerals

| 10 | Pneumatic Tire |
|---|---|
| 12 | Rim |
| 14 | Tire/Rim Assembly |
| 16 | Outside Bead Parts |
| 17 | Tire Inside Surface |
| 18 | Outside Bead Cores |
| 20 | Tire Side Parts |
| 22 | Tread Part |
| 24 | Partition Wall Parts |
| 25 | Inside Bead Parts |
| 26 | Main Air Chamber |
| 28 | First Auxiliary Air Chamber |
| 30 | Second Auxiliary Air Chamber |
| 31 | Inside Bead Cores |
| 32 | First Carcass Ply |
| 37 | Second Carcass Ply |
| 38 | Reinforcement Layers |
| 46 | Outside Bead Sheets |
| 48 | Inside Bead Sheets |
| 50 | Flanges |
| 52 | Step Parts |
| 54 | Drop |
| K | Return Folding Point |

The invention claimed is:

1. A pneumatic tire comprising:
a pair of right and left tire side parts formed on both tire width direction sides;
a tread part that interconnects a tire radial direction outside end of one of the tire side parts and a tire radial direction outside end of the other of the tire side parts of the pair of right and left tire side parts; and
a pair of right and left partition wall parts that are disposed between outside bead parts formed in the pair of right and left tire side parts and apart from the outside bead parts in the tire width direction, extend inward in the tire radial direction from a tire inside surface of at least one of the tire side parts and the tread part, are configured to include inside bead parts that contact a rim at their tire radial direction inside ends, and tripartition in the tire width direction a tire air chamber formed by the tire side parts, the tread part and the rim,
wherein the inner diameter of the outside bead parts is formed to be larger than the inner diameter of the inside bead parts,
a pair of right and left reinforcement layers are disposed in regions ranging from the partition wall parts to the tire side parts via connection parts between the partition wall parts and the tire inside surface such that the reinforcement layers continue from the partition wall parts to the tire side parts via the connection parts between the partition wall parts and the tire inside surface,
outside bead cores that extend along a tire circumferential direction are disposed at the pair of right and left outside bead parts,
inside bead cores that are disposed at tire width direction inner sides of the outside bead cores and extend along the tire circumferential direction are disposed at the pair of right and left inside bead parts,
a first carcass ply that is configured to toroidally bridge the pair of outside bead cores and both of whose tire width direction end sides are locked to the pair of outside bead cores is disposed in a region ranging from one of the tire side parts to the other of the tire side parts via the tread part,
a second carcass ply that is disposed on the tire inner side of the first carcass ply, configured to toroidally bridge the pair of inside bead cores, and both of whose tire width direction end sides are locked to the pair of inside bead cores is disposed in a region ranging from one of the partition wall parts to the other of the partition wall parts via the tread part,
partition wall rubber layers that extend inward in the tire radial direction along the tire outer side of the second carcass ply from the tire inside surface of at least one of the tire side parts and the tread part and whose tire radial direction inside ends are formed so as to contact the rim are disposed at the pair of right and left partition wall parts, and
the pair of right and left reinforcement layers are disposed at the tire inner side of the first carcass ply and the tire outer side of the second carcass ply.

2. The pneumatic tire of claim 1, wherein the reinforcement layers are configured by any of slanting cord layers, triaxial fabric, or nonwoven fabric, or by a combination of these.

3. The pneumatic tire of claim 1, wherein when RO represents the inner diameter of the outside bead parts and RI represents the inner diameter of the inside bead parts, then 0<RO−RI<50 mm is satisfied.

4. The pneumatic tire of claim 1, wherein when
return folding points of the reinforcement layers are located in tire radial direction outermost portions of the reinforcement layers positioned on the connection parts between the partition wall parts and the tire inside surface,
W1 represents the length of a portion of each of the reinforcement layers extending toward the inside bead parts along the reinforcement layers from the return folding points of the reinforcement layers,
W2 represents the length of a portion of each of the reinforcement layers extending toward the outside bead parts along the reinforcement layers from the return folding points of the reinforcement layers,
FH1 represents, when the reinforcement layers are hypothetically allowed to extend as far as inside bead part projecting end reference lines that are parallel to a tire rotational axis direction and pass through bead base projecting ends of the inside bead parts along the partition wall parts, the length of a portion of each of the partition wall parts ranging from the return folding points of the reinforcement layers to intersection points between hypothetical extension lines of the reinforcement layers and the inside bead part projecting end reference lines, and FH2 represents, when the reinforcement layers are hypothetically allowed to extend as far as outside bead part projecting end reference lines that are parallel to the tire rotational axis direction and pass through bead base projecting ends of the outside bead parts along the tire side parts, the length of a portion of each of the tire side parts ranging from the return folding points of the reinforcement layers to intersection points between hypothetical extension lines of the reinforcement layers and the outside bead part projecting end reference lines, then $10\text{ mm} \leqq W1 \leqq FH1$ and $10\text{ mm} \leqq W2 \leqq FH2$ are satisfied.

5. The pneumatic tire of claim 1, wherein one tire width direction end side of the second carcass ply is rolled up from the tire outer side to the inside at one of the pair of right and left inside bead cores, and the other tire width direction end side of the second carcass ply is rolled up from the tire outer side to the inside at the other of the pair of right and left inside bead cores.

6. The pneumatic tire of claim 1, wherein when

RO represents the inner diameter of the outside bead parts and RI represents the inner diameter of the inside bead parts, TW represents the tread width of the tread part in a flat plane in a state in which the pneumatic tire has been filled with air to a prescribed internal pressure and bears a prescribed load, intersection points between a first hypothetical reference line that extends along the tire side parts and the tread part and passes through thickness direction intermediate points of the tire side parts and the tread part and second hypothetical reference lines that extend along the partition wall parts and pass through thickness direction intermediate points of the partition wall parts are located in the tire side parts and the connection parts between the tread part and the partition wall parts, and KW represents a dimension in the tire width direction between one and the other of the connection parts, TH represents tire height, and KD represents ½ of a dimension equal to the difference when the inner diameter of the outside bead parts is subtracted from the inner diameter of the connection parts, then RO>RI, TW<KW, and $KD \geqq \frac{1}{2}TH$ are satisfied.

7. A tire/rim assembly comprising:

the pneumatic tire of claim 1; and a rim to which the pneumatic tire attaches, wherein the rim includes a pair of right and left outside bead sheets that contact inner peripheral surfaces of the pair of right and left outside bead parts, a pair of right and left inside bead sheets that are disposed via step parts at rim axial direction inner sides of the pair of right and left outside bead sheets, set to be smaller in diameter than the outside bead sheets, and contact inner peripheral surfaces of the pair of right and left inside bead parts, and a drop that is disposed between one and the other of the pair of right and left inside bead sheets and set to be smaller in diameter than the inside bead sheets.

8. The tire/rim assembly of claim 7, wherein of the tire air chambers, the internal pressures of the tire air chambers formed on both tire axial direction sides are set to be higher than the internal pressure of the tire air chamber formed in the tire axial direction center.

9. A pneumatic tire comprising:

a pair of right and left tire side parts;

a tread part; and a pair of right and left partition wall parts that are disposed between outside bead parts formed in the pair of right and left tire side parts, extend inward in the tire radial direction from a tire inside surface of at least one of the tire side parts and the tread part, are configured to include inside bead parts that contact a rim at their tire radial direction inside ends, and tripartition in the tire width direction a tire air chamber formed by the tire side parts, the tread part and the rim, wherein the inner diameter of the outside bead parts is formed to be larger than the inner diameter of the inside bead parts, a pair of right and left reinforcement layers are disposed in regions ranging from the partition wall parts to the tire side parts via connection parts between the partition wall parts and the tire inside surface such that the reinforcement layers continue from the partition wall parts to the tire side parts via the connection parts between the partition wall parts and the tire inside surface, and wherein outside bead cores that extend along a tire circumferential direction are disposed at the pair of right and left outside bead parts, inside bead cores that are disposed at tire width direction inner sides of the outside bead cores and extend along the tire circumferential direction are disposed at the pair of right and left inside bead parts, a first carcass ply that is configured to toroidally bridge the pair of outside bead cores and both of whose tire width direction end sides are locked to the pair of outside bead cores is disposed in a region ranging from one of the tire side parts to the other of the tire side parts via the tread part, and a second carcass ply that is disposed on the tire inner side of the first carcass ply, configured to toroidally bridge the pair of inside bead cores, and both of whose tire width direction end sides are locked to the pair of inside bead cores is disposed in a region ranging from one of the partition wall parts to the other of the partition wall parts via the tread part.

10. The pneumatic tire of claim 9, wherein partition wall rubber layers that extend inward in the tire radial direction along the tire outer side of the second carcass ply from the tire inside surface of at least one of the tire side parts and the tread part and whose tire radial direction inside ends are formed so as to contact the rim are disposed at the pair of right and left partition wall parts, and the pair of right and left reinforcement layers are disposed at the tire inner side of the first carcass ply and the tire outer side of the second carcass ply.

* * * * *